US012387445B2

(12) United States Patent
Tiku et al.

(10) Patent No.: US 12,387,445 B2
(45) Date of Patent: Aug. 12, 2025

(54) THREE-DIMENSIONAL MODELS OF USERS WEARING CLOTHING ITEMS

(71) Applicant: Micron Technology, Inc., Boise, ID (US)

(72) Inventors: Saideep Tiku, Folsom, CA (US); Poorna Kale, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 302 days.

(21) Appl. No.: 17/823,734

(22) Filed: Aug. 31, 2022

(65) Prior Publication Data

US 2024/0071019 A1 Feb. 29, 2024

(51) Int. Cl.

| | |
|---|---|
| ***G06T 19/20*** | (2011.01) |
| ***G06Q 30/0601*** | (2023.01) |
| ***G06Q 50/00*** | (2024.01) |
| ***G06V 20/20*** | (2022.01) |
| ***G06V 20/64*** | (2022.01) |

(52) U.S. Cl.

CPC .............. *G06T 19/20* (2013.01); *G06V 20/20* (2022.01); *G06V 20/64* (2022.01); *G06Q 30/0643* (2013.01); *G06Q 50/01* (2013.01); *G06T 2210/16* (2013.01); *G06T 2219/2024* (2013.01)

(58) Field of Classification Search

None

See application file for complete search history.

(56) References Cited

U.S. PATENT DOCUMENTS

| | | | | |
|---|---|---|---|---|
| 11,004,138 | B2 * | 5/2021 | Giampaolo | G06Q 10/087 |
| 11,593,868 | B1 * | 2/2023 | Kantamneni | G06T 7/68 |
| 2005/0027612 | A1 * | 2/2005 | Walker | G06Q 30/06 705/26.7 |
| 2013/0215116 | A1 * | 8/2013 | Siddique | G06Q 20/40 705/26.7 |
| 2013/0260727 | A1 * | 10/2013 | Knudson | G06Q 30/0631 455/414.1 |
| 2014/0176565 | A1 * | 6/2014 | Adeyoola | G06F 16/5854 345/473 |
| 2017/0270574 | A1 * | 9/2017 | Hessurg | G06Q 30/0601 |
| 2021/0090209 | A1 * | 3/2021 | Appleboim | G06Q 30/0631 |
| 2021/0224886 | A1 * | 7/2021 | Fu | G06Q 30/0623 |
| 2022/0067999 | A1 * | 3/2022 | Iwasaki | G06T 11/60 |
| 2024/0037858 | A1 * | 2/2024 | Assouline | A63F 13/69 |

* cited by examiner

*Primary Examiner* — Michael J Cobb

(74) *Attorney, Agent, or Firm* — Harrity & Harrity, LLP

(57) ABSTRACT

In some implementations, an extended reality (XR) device may detect, using a camera of the XR device, a clothing item, wherein the clothing item is associated with an identifier. The XR device may transmit, to a server, a request that indicates the identifier. The XR device may receive, from the server, metadata associated with the clothing item, wherein the metadata is associated with the identifier. The XR device may retrieve, from the server, a three-dimensional model of a user associated with the XR device. The XR device may generate a three-dimensional model of the user wearing the clothing item using the three-dimensional model of the user and the metadata. The XR device may provide, via an interface of the XR device, the three-dimensional model of the user wearing the clothing item.

25 Claims, 13 Drawing Sheets

THREE-DIMENSIONAL MODELS OF USERS WEARING CLOTHING ITEMS

TECHNICAL FIELD

The present disclosure generally relates to extended reality (XR) devices and, for example, generating three-dimensional models of users wearing clothing items.

BACKGROUND

Extended reality (XR) may blend a physical world (or real world) and a virtual world (or digital world) to create a more personalized, immersive visual experience. XR may encompass augmented reality (AR), mixed reality (MR), and virtual reality (VR). AR may provide an interactive experience of a physical-world environment, in which objects that reside in the physical world may be enhanced by computer-generated perceptual information. MR may merge physical and virtual worlds to produce new environments and visualizations, in which physical and digital objects may co-exist and interact in real time. VR may provide a fully virtual world without an intervention of the physical world. XR may be across multiple sensory modalities, including visual, auditory, haptic, somatosensory, and/or olfactory. XR may be useful across a wide variety of applications, such as gaming, healthcare, retail, customer service, and/or manufacturing.

DETAILED DESCRIPTION

Figure 1A:
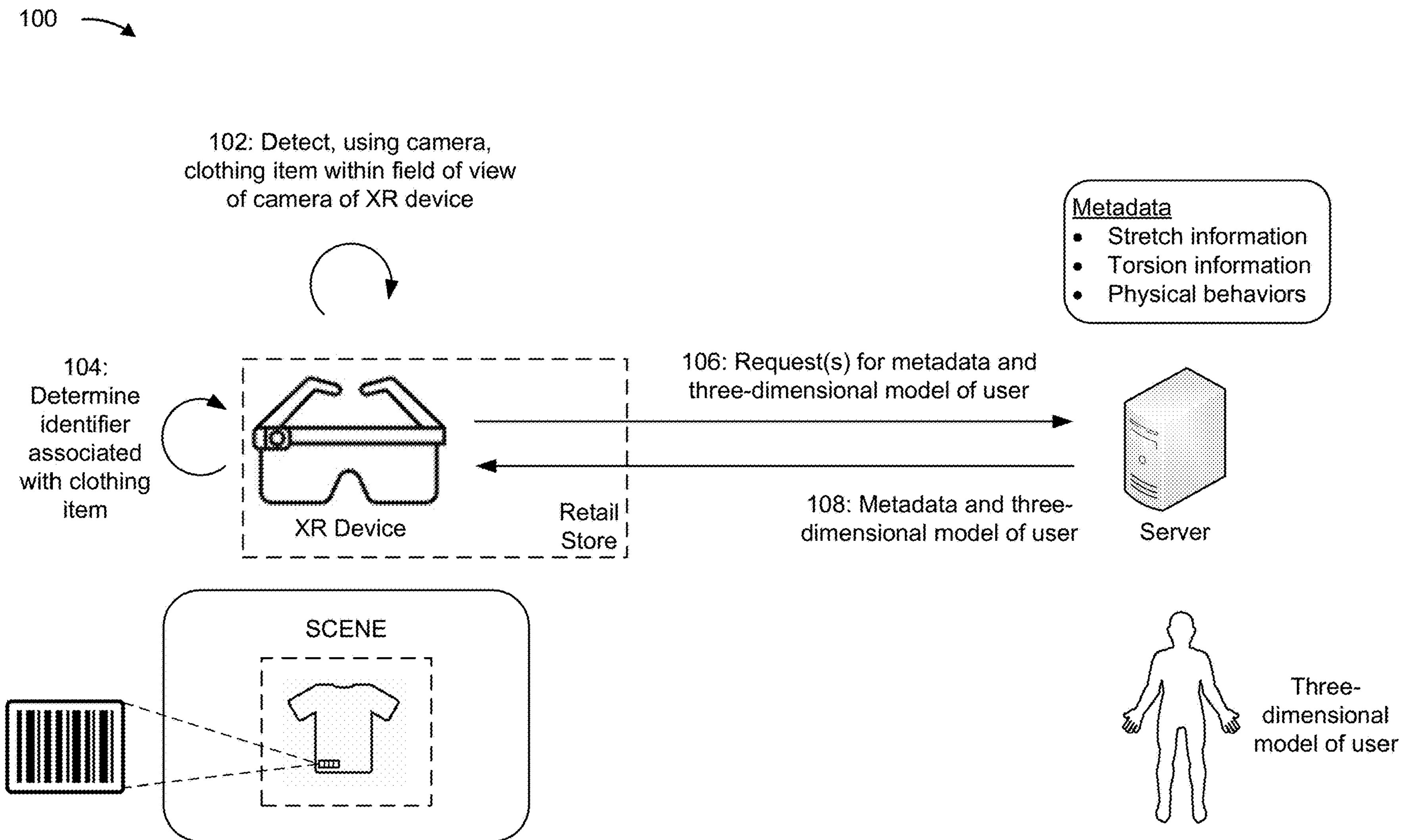
FIGS. 1A-1D are diagrams of an example related to generating three-dimensional models of users wearing clothing items.

A user may visit a physical retail store to shop for clothing items. The user may walk around the physical retail store and see clothing items that may be of interest to the user. The user may gather the clothing items and try on the clothing items in a fitting room. The fitting room may include a mirror, which may allow the user to see how the clothing items look when they are wearing the clothing items. The user may try on each of the clothing items. The user may decide to purchase clothing items depending on the fit, look, and/or comfort of the clothing items.

When shopping at the physical retail store, the user may try on each clothing item in the fitting room. After gathering the clothing items that may be of interest, the user may spend an amount of time trying on each clothing item. The user may intend to wear the clothing item at a later time, during which the user may have different physical attributes (e.g., a different hairstyle or a slimmer figure), but the user may have trouble imagining how the clothing item may look at the later time. The user may intend to wear the clothing item at a particular location, and the user may have trouble imagining how the clothing item may look at the particular location. The user may wish to receive feedback from friends and/or family regarding the clothing item and how the user looks wearing the clothing item. The user may show themselves wearing the clothing item to other people that are with the user at the physical retail store, but people that are outside of the physical retail store may not be able to see the user wearing the clothing item. The user may take a picture of themselves using a smartphone, and then send the picture to mobile devices associated with the friends and/or family members, but this process may be cumbersome. As a result, the user may need to decide whether to purchase clothing items with minimal feedback from other people.

The user may need to travel to various stores to find the right clothing item, without knowing until later whether the clothing item is the correct style, fit, etc., which may waste fuel, create wear and tear on the user's vehicle, and consume store resources to purchase and possibly return the clothing item. Further, when obtaining feedback from family and/or friends, the user may be wasting computing resources on their mobile device, and computing resources may be wasted on the computing devices of the family and/or friends in transmitting images and text messages. For example, the user may need to send multiple messages containing images and/or videos of clothing items to solicit feedback from friends and family. In addition, the computing device of the user may need to process numerous messages from friends and family containing feedback on the clothing item Alternatively, the user may visit an online retail store (e.g., an online marketplace). The user may use a browser running on a computing device to access a website associated with the online retail store. The user may browse through clothing items. The user may read descriptions and/or reviews of the clothing items. The user may decide to purchase clothing items based on information gathered about the clothing items via the online retail store. After the clothing items are delivered, the user may try on the clothing items to confirm whether the fit, look, and/or style are suitable for the user.

When shopping at the online retail store, the user may be unable to see how the clothing item looks on them. For example, the user may be limited to seeing the clothing item by itself on a device screen, but may not be presented with an accurate representation of how the clothing item specifically looks on them. The user may see the clothing item as a two-dimensional image, which may fail to accurately show how the clothing item will fit on the user. Only after the user receives the clothing item in the mail, the user may be able to try on the clothing item and assess the fit, look, and/or style of the clothing item when worn by the user. If the clothing item is not suitable, the user may need to undergo the process of returning the clothing item, and possibly ordering another clothing item (e.g., a different style and/or size). The user may intend to wear the clothing item at a later time, during which the user may have different physical attributes, but the user may have trouble imagining how the clothing item may look at the later time. The user may intend to wear the clothing item at the particular location, and the user may have trouble imagining how the clothing item may look at the particular location. The user cannot easily solicit feedback from friends and/or family regarding the clothing item. The user may send a link to an electronic page that shows the clothing item for sale, but the user may need to obtain and send the link to each of the friends and/or family, which may be a cumbersome process.

In some implementations described herein, to solve the problems described above, a solution is described herein for generating three-dimensional models of users wearing clothing items using extended reality (XR). An XR device may detect, using a camera, a clothing item, which may be within a field of view of the camera of the XR device. The clothing item may be located in a physical retail store, and the clothing item may be within the field of view of the camera. Alternatively, the clothing item may be displayed via an electronic page, in which case a computing device that displays the electronic page with the clothing item may be within the field of view of the camera of the XR device. Irrespective of whether the clothing item is located in the physical retail store or displayed via the electronic page, the XR device determines an identifier associated with the clothing item. The XR device may determine, based on the identifier, metadata associated with the clothing item. The XR device may identify a three-dimensional model of the user. The three-dimensional model may be a body wire frame associated with the user. The XR device may generate a three-dimensional model of the user wearing the clothing item using the three-dimensional model of the user and the metadata. The XR device may provide, via an interface of the XR device, the three-dimensional model of the user wearing the clothing item.

In some implementations, when shopping at a physical retail store when wearing (or carrying) the XR device, the user may not need to try on each clothing item. Rather, the XR device may provide, via the interface, a three-dimensional model of the user wearing each clothing item, which may allow the user to easily determine whether a particular clothing item is suitable or not. The interface may provide augmented controls (e.g., a virtual slider) for modifying features (e.g., a hairstyle or accessories) of the three-dimensional model of the user wearing the clothing item, such that the user may easily imagine how the clothing item looks on them. The interface may provide a scene on which the three-dimensional model of the user wearing the clothing item is overlayed, such that the user may easily imagine how the user looks when wearing the clothing item in a particular location. The XR device may share the three-dimensional model of the user wearing the clothing item with other computing devices, which may allow the XR device to receive feedback from people associated with the other computing devices. The feedback may be helpful to the user when deciding whether to purchase the clothing item.

When shopping at the online store when wearing (or carrying) the XR device, the XR device may provide, via the interface, the three-dimensional model of the user wearing each clothing item, which may allow the user to easily determine whether the particular clothing item is suitable or not. As a result, the user may be less likely to initiate the process of returning the clothing item (e.g., packaging the clothing item in a box, printing a shipping label/receipt, and driving to a location to mail the box). Another benefit is that the interface may provide augmented controls for modifying features of the three-dimensional model of the user wearing the clothing item. The interface may provide the scene on which the three-dimensional model of the user wearing the clothing item is overlayed. The XR device may share the three-dimensional model of the user wearing the clothing item with the other computing devices.

In some implementations, generating the three-dimensional model of the user (e.g., the wire frame model of the body) may save computing resources and memory as compared to other modeling techniques while providing adequate surface area to accurately show how clothes will fit on the user in the real-world. The wire frame model may be less computationally intensive as compared to more robust/complex modeling techniques.

FIGS. 1A-1D are diagrams of an example 100 related to generating three-dimensional models of users wearing clothing items. As shown in FIGS. 1A-1D, example 100 includes an XR device, a server, a social media platform, and computing devices. These devices are described in more detail in connection with FIGS. 6 and 7.

In some implementations, an XR device may be a head-mounted display worn by a user. Alternatively, the XR device may be a mobile device carried by the user. The XR device may provide augmented reality (AR), mixed reality (MR), and/or virtual reality (VR) capabilities. In some implementations, the server may be associated with a cloud computing system or an edge computing system. In some implementations, the social media platform may facilitate an exchange of information via social networks. "User," "customer," and "person" may be used interchangeably herein.

In some implementations, the XR device and/or the server may support a deep learning accelerator (DLA). The DLA may be a hardware architecture designed and optimized for increased speed, efficiency, and accuracy, as compared to non-DLA architectures, when running deep learning algorithms, such as convolutional neural networks (CNNs), recurrent neural networks (RNNs), and/or generative adversarial networks (GANs), among other examples. The DLA may enable inference tasks to be performed more rapidly and using less energy as compared to general-purpose computers.

In some implementations, the DLA may by supported/used for processing and learning with respect to various tasks. Such tasks, which are further described herein, may include detecting, using a camera of the XR device, a clothing item; determining an identifier associated with the clothing item; determining metadata associated with the clothing item; generating a three-dimensional model of a user wearing the clothing item; and/or generating feedback for the three-dimensional model of the user wearing the clothing item based on historical feedback.

As shown in FIG. 1A, and by reference number 102, the XR device may detect, using a camera of the XR device, a clothing item. The clothing item may be within a field of view of the camera of the XR device. The XR device may capture, using the camera, an image of the field of view. The XR device may use object recognition or other related techniques to analyze the image and determine the clothing item in the image. In some situations, the XR device may be located inside of a physical retail store, and the clothing item may be available for sale in the physical retail store. The user that is wearing (or carrying) the XR device may be within a certain distance from the clothing item (e.g., one to four meters), such that the camera of the XR device may be able to capture an image of the clothing item. The user may view the clothing item in the real world, and may use the XR device to capture the image of the clothing item. In some cases, the user may hold the clothing item in front of the camera for a certain period of time (e.g., three seconds), at which point the camera may capture the image of the clothing item. The XR device may wait for the user to be stationary for the certain period of time before identifying the clothing item. In some cases, the XR device may wait for the user to provide an input (e.g., a verbal command), at which point the camera may capture the image of the clothing item.

In some implementations, a "clothing item" may refer to a wearable item, such as an item that is worn on the body of the user. "Clothing item" may include clothes, but may also include accessories, such as jewelry or shoes. In other words, "clothing item" may not be limited to clothes, but rather may include all types of items that may be worn on the body of the user.

As shown by reference number 104, the XR device may determine an identifier associated with the clothing item. The identifier may be a product number, a product code, or another type of identifier that uniquely identifies the clothing item. For example, the XR device may scan, using the camera, a tag that indicates a code (e.g., a bar code or a quick response (QR) code) associated with the clothing item. The user may hold the clothing item in front of the camera such that the tag of the clothing item is in the field of view of the camera. The XR device may read the code based on the image captured by the camera. The XR device may determine the identifier associated with the clothing item based on the code. The XR device may look up the identifier in a database to obtain additional information about the clothing item, such as clothing type, features, size, price, brand, and/or other information.

In some implementations, the XR device may perform an image analysis to determine whether the code is in the image, and then the XR device may perform an image analysis to read the code. The XR device may generate an error when the code is not in the image, or the XR device may generate an error when the code is only partially visible in the image. In some implementations, the XR device may capture an image of the clothing item and compare the image to a stored image (e.g., in a cache) of a matching clothing item. The stored image may indicate an identifier associated with the matching clothing item. In some situations, the XR device may be able to determine, from the image, the clothing item, but not the identifier associated with the clothing item. In these situations, the XR device may access stored images to determine an identifier associated with the clothing item.

In some implementations, the XR device may determine the identifier associated with the clothing item based on the tag being a near field communication (NFC) radio frequency identification (RFID) tag, in which case the tag may transmit signals actively or in response to being pinged by the XR device. The signals may indicate the identifier associated with the clothing item. This approach may be useful when the tag is not visible to the camera.

As shown by reference number 106, the XR device may transmit, to the server, a first request for metadata associated with the clothing item. The XR device may transmit the first request based on the identifier associated with the clothing item being determined. The first request may indicate the identifier associated with the clothing item. The server may receive the first request. The server may look up, in a database, metadata associated with the clothing item. The server may search the database for the metadata using the identifier associated with the clothing item. The database may store metadata for a plurality of clothing items based on identifiers associated with the clothing items. The metadata may include information about the clothing item, which may include stretch information, torsion information, and/or other physical behaviors (e.g., a clothing material, which may be used to determine a stretch associated with the clothing item). The metadata may indicate physics or physical characteristics of the clothing item, such as the stretch information, the torsion information, and/or the physical behaviors. A particular clothing item may be associated with unique metadata, due to the clothing item having different physical properties as compared to another clothing item. In some implementations, the server may not identify metadata associated with the clothing item. In this case, the server may determine a similar clothing item (e.g., a clothing item having a similar style, manufacturer, size, material, etc.), and the server may identify metadata associated with the similar clothing item.

In some implementations, the XR device may transmit, to the server, a second request for a three-dimensional model of the user. The XR device may transmit the second request based on the identifier associated with the clothing item being determined. The second request may indicate a user identifier, which may identify the user. The server may look up, in a database, the three-dimensional model of the user. The three-dimensional model may be a body wire frame. The body wire frame may be a visual representation of the user. In some implementations, the three-dimensional model may have been previously created for the user. For example, the user may have previously created the three-dimensional model using a smart phone, and uploaded the three-dimensional model to the server. In this case, complex processing for generating the three-dimensional model may be offloaded to an edge computing system using a high speed connection and the results (e.g., a final three-dimensional model) may be delivered to or rendered on the smart phone. As another example, the user may have previously created the three-dimensional model at the physical retail store (e.g., using a body scanner), and the three-dimensional model may have been stored on the server. In some cases, the three-dimensional model may be created by leveraging a prior model, such that a completely new three-dimensional may not need to be generated for the user. For example, an existing three-dimensional model may be modified based on similarities between an earlier user and a current user, which may save computing and memory resources, as well as expedite a model generation process.

In some implementations, the database that stores metadata associated with a plurality of clothing items and the database that stores three-dimensional models for a plurality of users may be separate databases. The three-dimensional model of the user may be stored within the user's personal data, and may be physically separated from personal data of other users (e.g., stored in different parts of memory) for enhanced security.

In some implementations, the XR device may transmit, to the server, a single request for the metadata associated with the clothing item and the three-dimensional model of the user, which may reduce an amount of signaling between the XR device and the server.

As shown by reference number 108, the server may transmit, to the XR device based on the request(s), a response. The response may indicate the metadata associated with the clothing item, such as the stretch information, the torsion information, and/or the other physical behaviors. The response may indicate the three-dimensional model of the user, which may be the body wire frame associated with the user. The XR device may determine the metadata associated with the clothing item, and the XR device may identify the three-dimensional model of the user, based on the response received from the server.

Figure 1B:
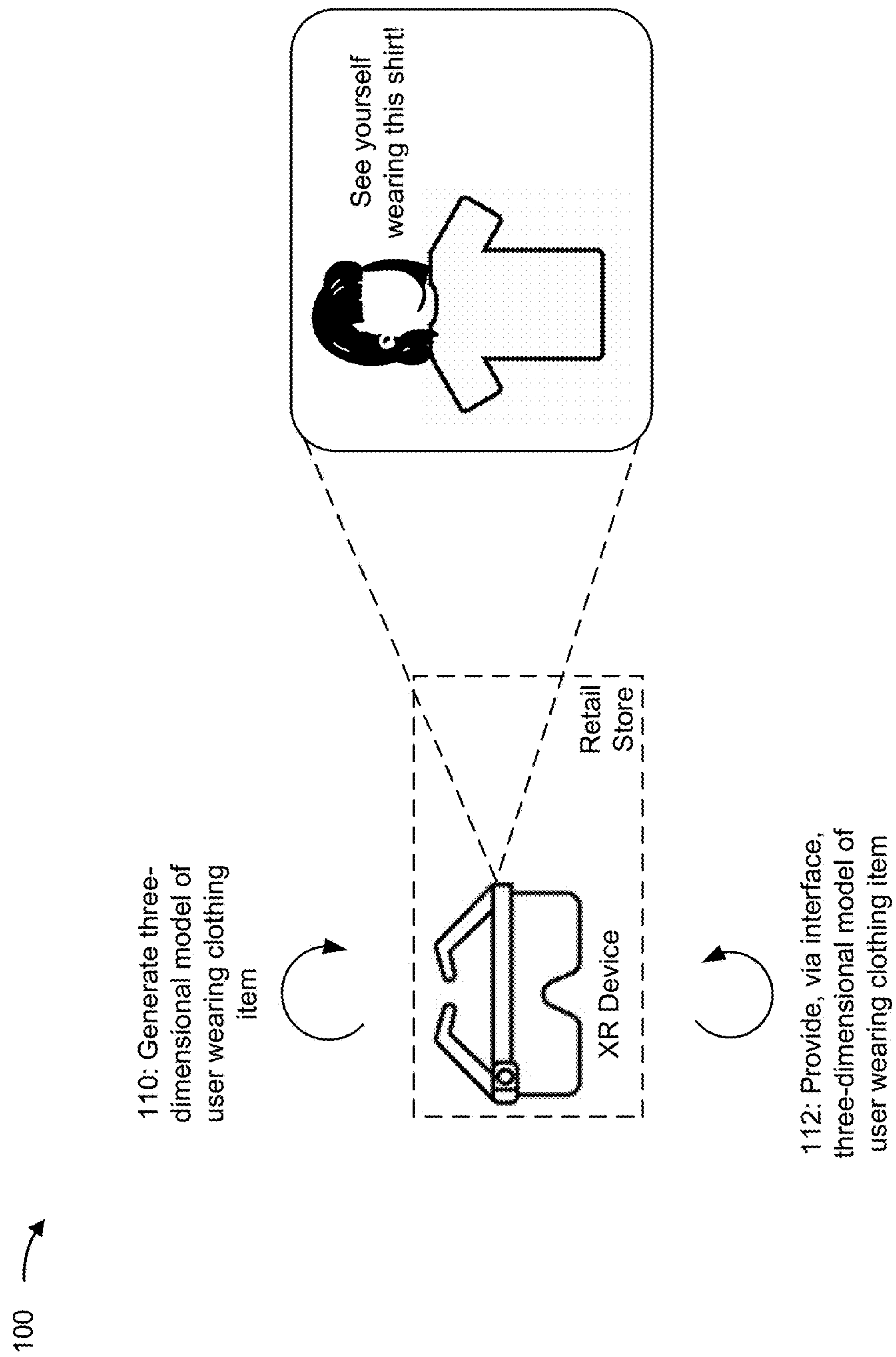

As shown in FIG. 1B, and by reference number 110, the XR device may generate a three-dimensional model of the user wearing the clothing item, which may be based on the three-dimensional model of the user and the metadata, as received from the server. The XR device may apply the clothing item to the three-dimensional model of the user, based on the metadata, to generate the three-dimensional model of the user wearing the clothing item. The XR device may generate the three-dimensional model of the user wearing the clothing item using a three-dimensional graphics production workflow, which may include a modeling phase, a layout phase, and a rendering phase. The three-dimensional model of the user wearing the clothing item may indicate various features or characteristics of the clothing item, such as material, size, color, look, fit, etc., in relation to the user that is wearing the clothing item.

As shown by reference number 112, the XR device may provide, via an interface of the XR device, three-dimensional model of the user wearing the clothing item. For example, the XR device may display the three-dimensional model of the user wearing the clothing item, which may be presented as an overlay to a real world scene. While the user is looking at the clothing item at the physical retail store, the XR device may display the three-dimensional model of the user wearing the clothing item. By looking at the three-dimensional model of the user wearing the clothing item, the user may assess the material, size, color, look, fit, etc., of the clothing item. Further, the user may not need to physically try on the clothing item. Rather, the user may walk in front of a particular clothing item, and the XR device may display a three-dimensional model of the user wearing the clothing item. As a result, the user may easily assess whether particular clothing items look good on the user.

As an example, the user may walk within a certain distance (e.g., three feet) from a shirt available for sale at the physical retail store. An XR device, which is worn by the user, may scan a tag associated with the shirt, where the tag may indicate a barcode. The XR device may identify a product number of the shirt based on the barcode. The XR device may obtain metadata associated with the shirt (e.g., stretch information). The XR device may obtain a three-dimensional model of the user. The XR device may generate, for display via the interface, a three-dimensional model of the user wearing the shirt. By looking the three-dimensional model of the user wearing the shirt, the user may be able to make a decision regarding whether to purchase the shirt.

Figure 1C:
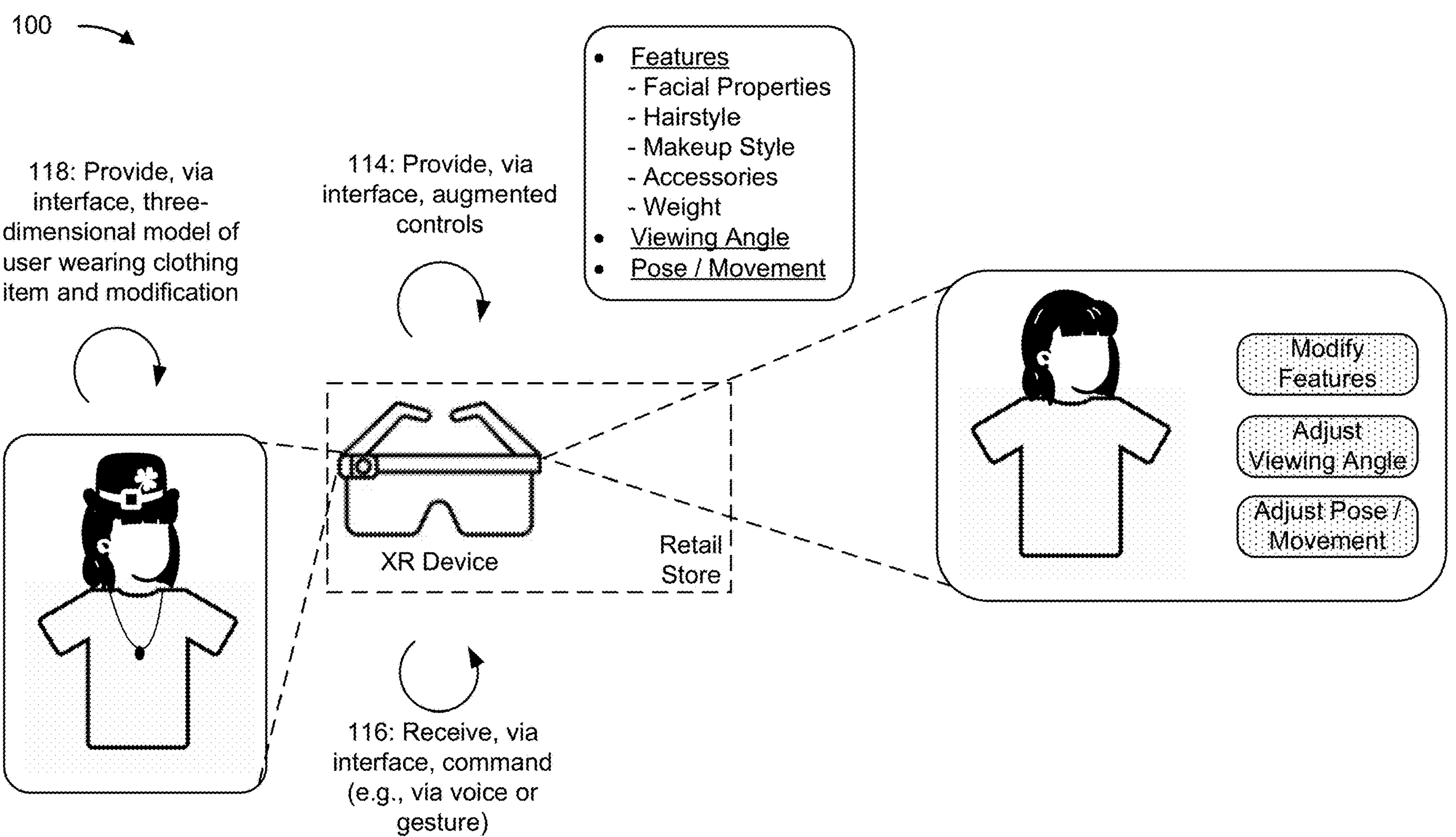

As shown in FIG. 1C, and by reference number 114, the XR device may provide, via the interface, augmented controls along with the three-dimensional model of the user wearing the clothing item. The augmented controls may be for performing a variety of actions with respect to the three-dimensional model of the user wearing the clothing item. For example, the augmented controls may enable modifying features of the three-dimensional model of the user wearing the clothing item. The features may include facial properties, a hairstyle, a makeup style, accessories, and/or a weight of the user. In some implementations, the interface may provide various categories, and each category may include different features that may be applied to the three-dimensional model of the user wearing the clothing item. For example, the interface may provide a category of hairstyles, and a selection of that category may result in different hairstyles that may be applied to the three-dimensional model of the user wearing the clothing item.

In some implementations, the XR device may provide, via the interface, augmented controls for adjusting a viewing angle associated with the three-dimensional model of the user wearing the clothing item. The viewing angle may be adjusted to view a front, a back, or a side of the three-dimensional model of the user wearing the clothing item. In some implementations, the XR device may provide, via the interface, augmented controls for adjusting a pose or a movement of the three-dimensional model of the user wearing the clothing item. For example, the pose may be adjusted to view a sitting position or a standing position of the three-dimensional model of the user wearing the clothing item. The movement may be adjusted to view the three-dimensional model of the user wearing the clothing item in a walking motion or in a running motion.

In some implementations, the augmented controls may include a virtual slider to adjust a look of the three-dimensional model of the user wearing the clothing item. At a minimum setting for the virtual slider, the three-dimensional model of the user wearing the clothing item may have a same face as the user wearing (or carrying) the XR device. Increasing a slider value associated with the virtual slider may involve generating a face that is visibly similar to the user, but not exactly the same, for privacy reasons. However, factors of the face such as face shape, hair, and/or racial ethnicity may be maintained depending on a user preference. The XR device may select a face that is visibly similar to the user's face from a plurality of faces stored in a database. In other words, the XR device may match the face of the user with one of the plurality of faces based on matching face characteristics, and the matched face may be used depending on the slider value.

As shown by reference number 116, the XR device may receive, via the interface, a command for modifying the features of the three-dimensional model of the user wearing the clothing item. The command may be a voice command or a gesture-based command. The command may indicate whether a particular feature should be applied to the three-dimensional model of the user wearing the clothing item. The command may indicate whether a different viewing angle should be applied to the three-dimensional model of the user wearing the clothing item. The command may indicate whether a different pose or movement should be applied to the three-dimensional model of the user wearing the clothing item.

As shown by reference number 118, the XR device may provide, via the interface, the three-dimensional model of the user wearing the clothing item and with the modified features. The modified features may be associated with certain face properties, a certain hairstyle, a certain makeup style, certain accessories, and/or a certain weight. As a result, by looking at the three-dimensional model of the user wearing the clothing item and with the modified features, the user may assess whether the modified features are suitable or whether other features should be selected.

As an example, the XR device may receive, via the interface, voice and/or gesture-based commands to add a hat and a necklace to the three-dimensional model of the user wearing the clothing item. The hat and the necklace may be some of a plurality of different accessories that are available. The XR device may generate the three-dimensional model of the user wearing the clothing item to include the hat and the necklace, which may be displayed via the interface of the XR device. In some cases, the user may not like the hat and/or the necklace, and the user may select another hat and/or necklace to view.

Figure 1D:
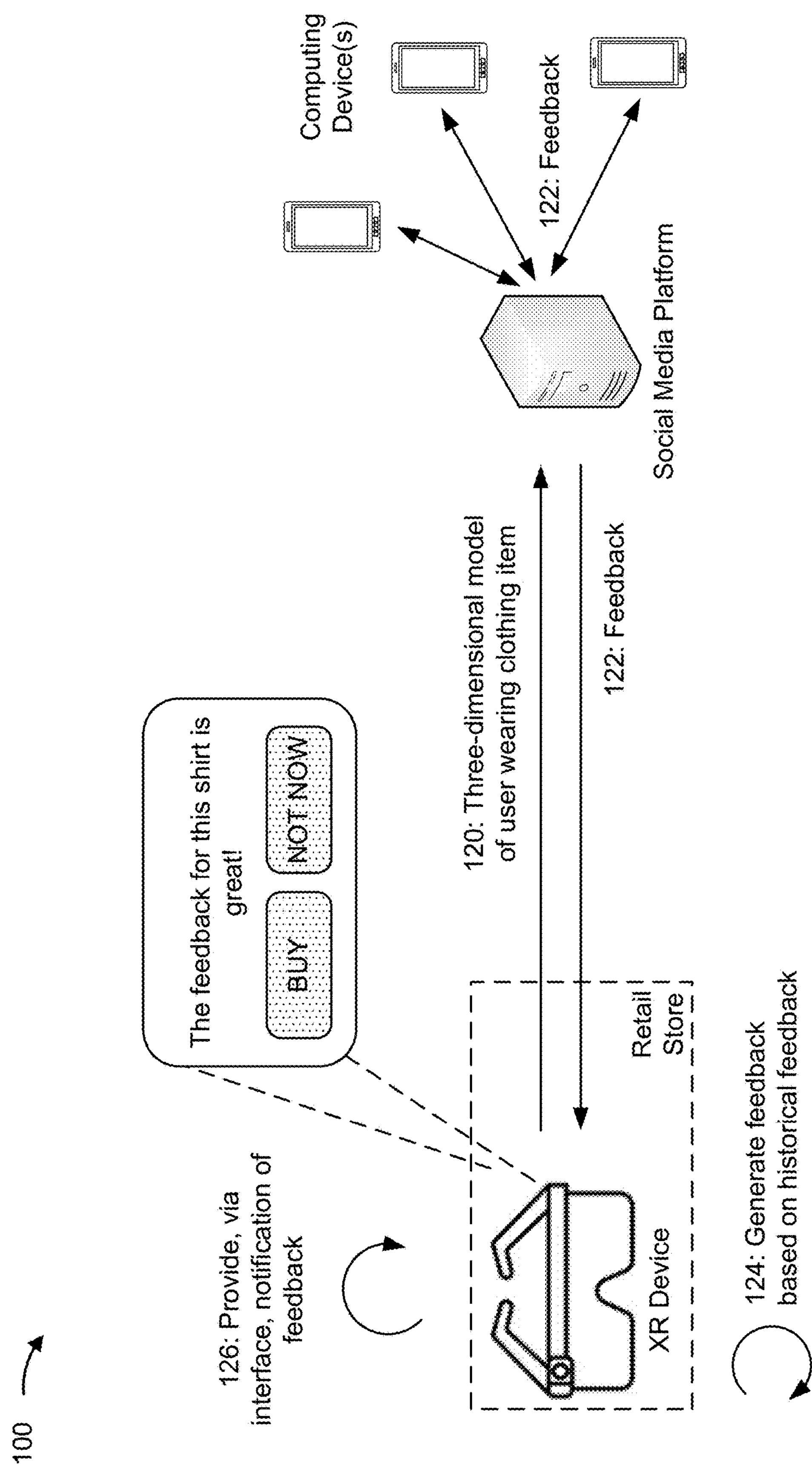

As shown in FIG. 1D, and by reference number 120, the XR device may transmit (or upload) the three-dimensional model of the user wearing the clothing item (with or without the modified features) to a social media platform. The social media platform may host a social network application, which may enable other users to communicate with the user associated with the XR device via a social network. The other users may be able to communicate with the user associated with the XR device based on a permission setting. For example, the user may identify other people to be included in a friends and family group associated with the social network application. The other users may belong to a same group (e.g., a fashion group or cultural group) as the user associated with the XR device. In some implementation, the other users may have a common age, profession, interest, or other demographic as compared to the user associated with the XR device. The three-dimensional model of the user wearing the clothing item that is uploaded to the social media platform may be viewable to the other users. The social media platform may notify the other users that the three-dimensional model of the user wearing the clothing item is available to view.

As shown by reference number 122, the social media platform may receive, from computing devices associated with the other users, feedback related to the three-dimensional model of the user wearing the clothing item. The feedback may include comments, a like or dislike indicator, a rating, or other information that indicates whether the other users approve or disapprove of the clothing item. For example, the feedback may provide opinions of the other users regarding whether the user associated with the XR device should purchase the clothing item. The social media platform may transmit the feedback, as received from the computing devices, to the XR device.

As shown by reference number 124, the XR device may generate the feedback associated with the three-dimensional model of the user wearing the clothing item based on historical feedback received from the computing devices via the social media platform. For example, the XR device may have previously uploaded three-dimensional models of the user wearing different clothing items. Different types of clothing items may have received different types of feedback in the past. The XR device may detect trends in the historical feedback and determine whether certain types of clothing items are likely to elicit certain types of feedback. As a result, in some cases, the XR device may not transmit the three-dimensional model of the user wearing the clothing item to the social media platform, but rather may rely on past feedback related to the previously uploaded three-dimensional models of the user wearing different clothing items. The feedback generated based on the historical feedback may include a confidence level, which may indicate a confidence associated with the feedback.

In some implementations, prior user input and crowd-sourced input (e.g., from family, friends, etc.) may be used by a machine learning model to make predictions regarding clothing styles, sizes, patterns, etc. for the user and/or to anticipate types of feedback the user may receive regarding his/her selection. The machine learning model may be employed to reduce returns, negative customer reviews, and reduce manufacturing waste.

As shown by reference number 126, the XR device may provide, via the interface, a notification based on the feedback satisfying a threshold. The feedback may be the feedback received via the social media platform and/or feedback generated based on the historical feedback. The notification may indicate a suggestion to purchase the clothing item based on the feedback. Alternatively, the notification may indicate a suggestion to not purchase the clothing item based on the feedback. In some cases, the notification may include other suggestions, such as a suggestion to try a different size or a different color. The user may perform a decision regarding whether to purchase the clothing item based on the notification.

In some implementations, the XR device may automatically initiate a purchase of the clothing item based on the feedback. For example, when the feedback satisfies the threshold, the XR device may automatically initiate the purchase of the clothing item based on a trigger-based buy of the clothing item. When the feedback does not satisfy the threshold, the XR device may not initiate the purchase of the clothing item.

In some implementations, the XR device may share the three-dimensional model of the user wearing the clothing item with a selected group of computing devices, which may be irrespective of the social media platform. The XR device may set a timer (e.g., 10 minutes) based on a user preference. The XR device may determine a recommended action with regard to purchasing the clothing item based on feedback received from the selected group of computing devices prior to an expiry of the timer. The XR device may provide, via the interface, an indication of the recommended action.

In some cases, the user may only be visiting a physical retail store for a certain duration, and may want to quickly know whether friends and/or family like a certain clothing item. The user may share the three-dimensional model of the user wearing the clothing item with a certain group of users, and may indicate a time limit for responding. Based on the feedback received within the time limit, the user may make a decision regarding whether to purchase the clothing item.

In some implementations, the XR device may identify a two-dimensional image of a clothing item. The XR device may receive the two-dimensional image of the clothing item from one of the computing devices. The XR device may access an electronic page, from which the two-dimensional image of the clothing item may be downloaded onto the XR device. The clothing item may be of interest to the user associated with the XR device. The XR device may generate the three-dimensional model of the user wearing the clothing item indicated by the two-dimensional image. The XR device may convert the two-dimensional image of the clothing item into three dimensions, and then applied to the three-dimensional model. As a result, the user may be able to adjust the three-dimensional model to incorporate various images of clothing items found by the user.

In some implementations, the XR device may generate the three-dimensional model of the user wearing the clothing item based on a scaling of the user and/or clothing item. A user profile may indicate dimensions of the user (e.g., height and weight) and a preferred clothing size for the user. The three-dimensional model of the user and/or the clothing item may be properly scaled to show an accurate representation of how the clothing item fits that user in particular, where the three-dimensional model may be generated to be aligned with the user profile. Further, the three-dimensional model of the user and/or the clothing item may be properly scaled to show an accurate representation in view of a background. For example, when the three-dimensional model of the user is displayed in a fitting room, the three-dimensional model may be properly scaled for that display.

As indicated above, FIG. 1 is provided as an example. Other examples may differ from what is described with regard to FIG. 1.

Figure 2:
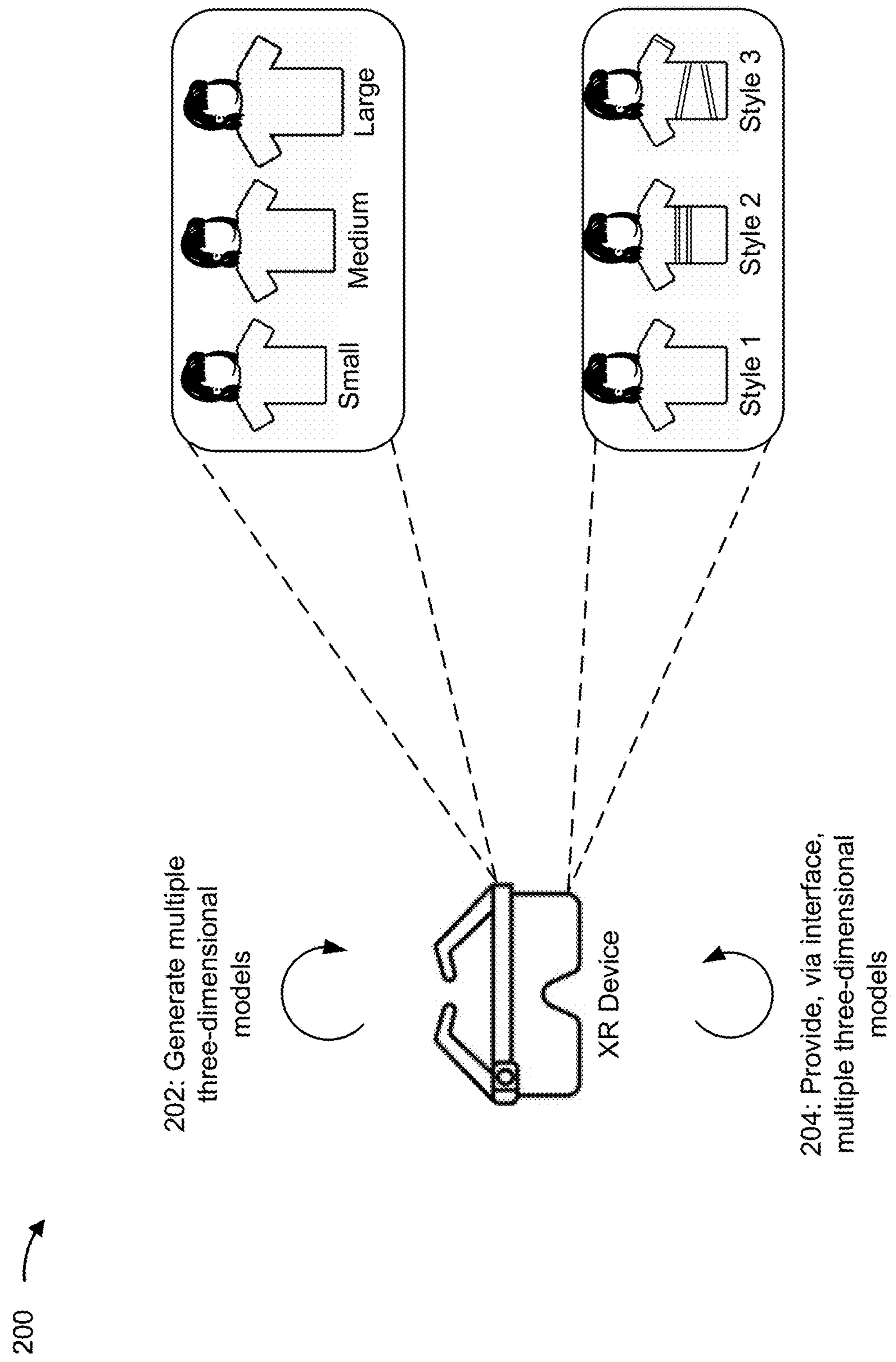
FIGS. 2-4 are diagrams of examples related to generating three-dimensional models of users wearing clothing items.

FIG. 2 is a diagram of an example 200 related to generating three-dimensional models of users wearing clothing items. As shown in FIG. 2, example 200 includes an XR device. This device is described in more detail in connection with FIGS. 6 and 7.

As shown by reference number 202, the XR device may generate multiple three-dimensional models of a user associated with the XR device. In some implementations, the XR device may detect, via a camera of the XR device, a single clothing item. The XR device may determine an identifier associated with the clothing item. The XR device may obtain metadata associated with the clothing item, which may be obtained based on the identifier. The XR device may obtain a three-dimensional model of the user. The XR device may generate the multiple three-dimensional models of the user wearing the clothing item. Each of the multiple three-dimensional models of the user may be associated with a different size of the clothing item (e.g., small, medium, and large) or color, but in each case, a type/style of the clothing item may be the same. In some implementations, the XR device may detect, via the camera of the XR device, different clothing items (or multiple clothing items) of different types (e.g., full sleeve and half sleeve), styles, and/or colors. The different clothing items may not be related to each other. The XR deice may determine identifiers associated with each of the different clothing items. The XR device may obtain metadata associated with each of the different clothing items. The XR device may obtain a three-dimensional model of the user. The XR device may generate the multiple three-dimensional models of the user wearing the different clothing items.

As shown by reference number 204, the XR device may provide, via the interface, the multiple three-dimensional models of the user, where the user may be wearing the same clothing item (but with different sizes and/or colors), or the user may be wearing different clothing items (e.g., differing styles of shirts). The interface may provide a side-by-side comparison of the multiple three-dimensional models of the user, which may allow the user to easily compare different clothing items, different styles, different colors, and/or different sizes.

As an example, the interface may provide three different models of the user, where each model is associated with a same shirt but with a different size. As another example, the interface may provide three different models of the user, where each model is associated with a different style shirt (e.g., shirts having different patterns).

In some implementations, the XR device may maintain a user profile, which may store measurements associated with the user. The XR device may compare the measurements associated with the user to measurements associated with a particular clothing item that is displayed via the interface. The XR device may provide a notification, via the interface, when the particular clothing item is too long or too tight based on the measurements associated with the user. The XR device may provide the notification along with a three-dimensional model of the user wearing the particular clothing item, such that the user may be able to virtually see if the particular clothing item may be too long, too tight, etc.

As indicated above, FIG. 2 is provided as an example. Other examples may differ from what is described with regard to FIG. 2.

Figure 3:
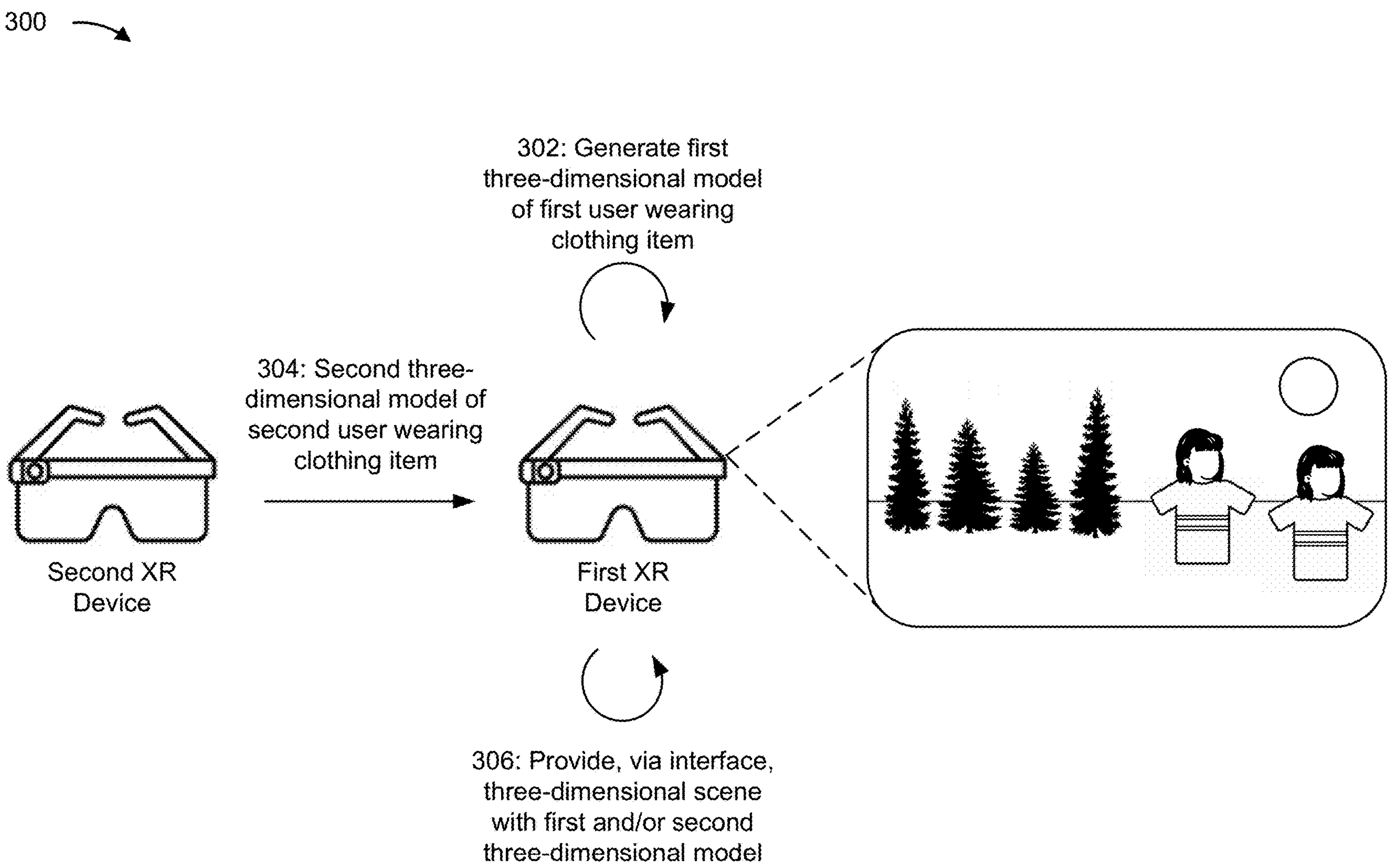

FIG. 3 is a diagram of an example 300 related to generating three-dimensional models of users wearing clothing items. As shown in FIG. 3, example 300 includes a first XR device and a second XR device. These devices are described in more detail in connection with FIGS. 6 and 7.

As shown by reference number 302, the first XR device may generate a first three-dimensional model of a first user wearing a clothing item. The first XR device may generate the first three-dimensional model of the first user wearing the clothing item based on an identifier associated with the clothing item, metadata associated with the clothing item, and a three-dimensional model of the first user.

In some implementations, the first XR device may provide, via an interface, a three-dimensional scene, and the first XR device may overlay the first three-dimensional model of the first user wearing the clothing item onto the scene. In other words, the interface may provide the three-dimensional scene on which the first three-dimensional model of the first user wearing the clothing item is overlayed. The first XR device may generate the scene based on a user input. For example, the first user may specify, via the interface, a type or place associated with the scene. As a result, the first user may be able to view the first three-dimensional model of the first user wearing the clothing item in the context of the three-dimensional scene (e.g., a wedding venue).

As shown by reference number 304, the first XR device may receive, from a second XR device, a second three-dimensional model of a second user wearing the clothing item. The second XR device may generate the second three-dimensional model of the second user wearing the clothing item based on an identifier associated with the clothing item, metadata associated with the clothing item, and a three-dimensional model of the second user. After generating the second three-dimensional model of the second user wearing the clothing item, the second XR device may transmit the second three-dimensional model of the second user wearing the clothing item to the first XR device.

As shown by reference number 306, the first XR device may provide, via the interface, the three-dimensional scene, on which the first three-dimensional model of the first user wearing the clothing item and the second three-dimensional model of the second user wearing the clothing item may be overlayed. As a result, the first user may be able to view both three-dimensional models of the first and second users wearing the clothing item in the context of the three-dimensional scene. For example, the first and second users may be members of a wedding party that occurs in an outside setting with trees, and the first user may want to ensure that outfits of the first and second user are matching outfits.

In some implementations, a first user may share their three-dimensional model with a second user, and the second user may use the three-dimensional model when shopping for the first user. For example, the first and second user may be spouses. The second user may use the first user's three-dimensional model when shopping for the first user, which may enable the second user to view the first user's three-dimensional model wearing certain clothing items.

As indicated above, FIG. 3 is provided as an example. Other examples may differ from what is described with regard to FIG. 3.

Figure 4:
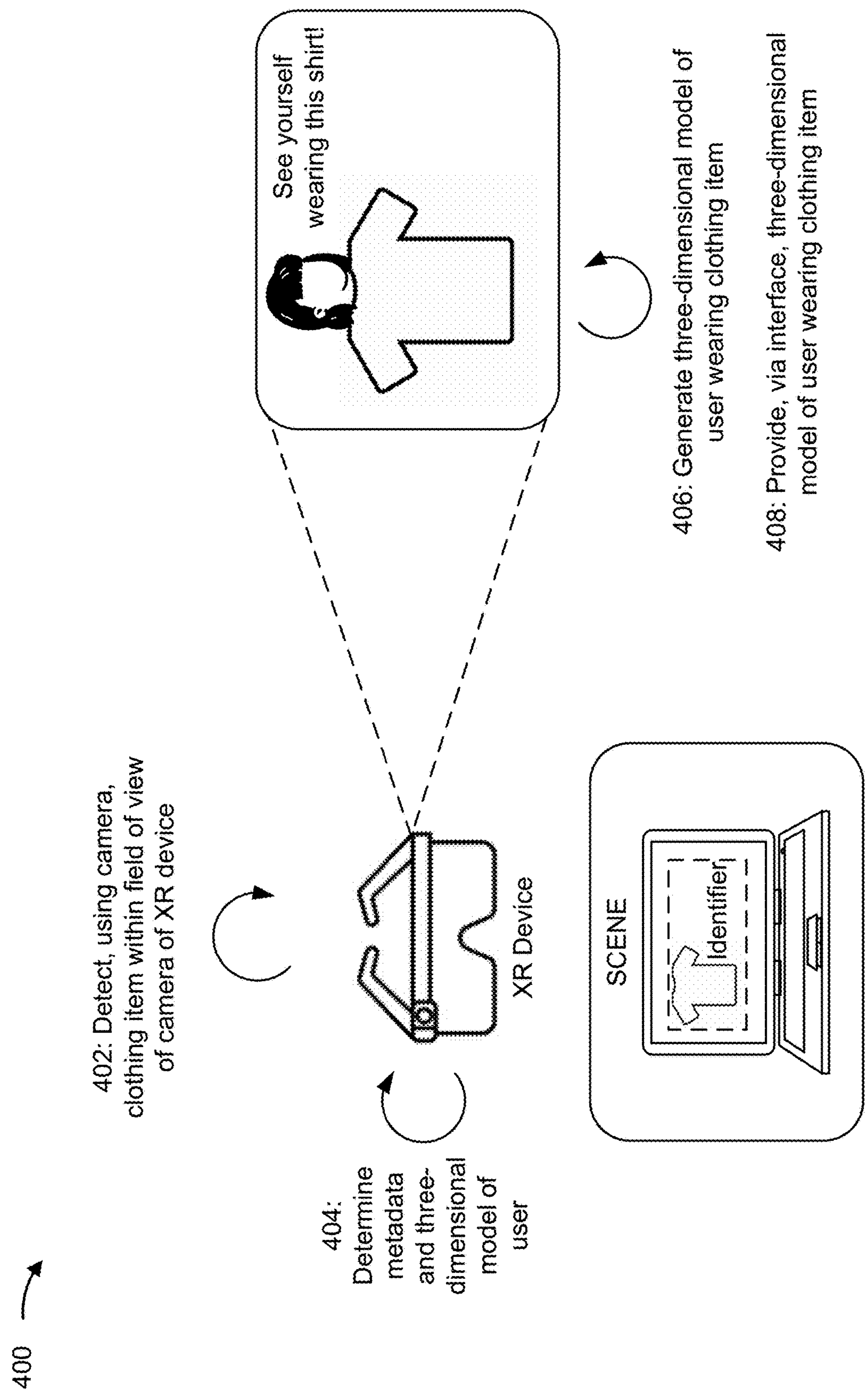

FIG. 4 is a diagram of an example 400 related to generating three-dimensional models of users wearing clothing items. As shown in FIG. 4, example 400 includes an XR device. This device is described in more detail in connection with FIGS. 6 and 7.

As shown by reference number 402, the XR device may detect, using a camera of the XR device, a clothing item and an identifier associated with the clothing item. The clothing item may be within a field of view of the camera of the XR device. The XR device may capture, using the camera, an image of the field of view. The XR device may use object recognition or other related techniques to analyze the image and determine the clothing item in the image. The XR device may use optical character recognition (OCR) or other related techniques to analyze the image and determine the identifier associated with the clothing item. For example, the XR device may use OCR to identify text and or numerals associated with a tag affixed to the clothing item. The clothing item may be displayed on a computing device, where the computing device may be within the field of view of the camera of the XR device. A user that is wearing (or carrying) the XR device may be looking at an electronic page displayed via the computing device. The electronic page may be associated with an online retail store. The electronic page may indicate that the clothing item is for sale, and the user may view the clothing item via a display screen of the computing device. The user may use the XR device to capture the displayed image of the clothing item.

As shown by reference number 404, the XR device may determine, based on the identifier associated with the clothing item, metadata associated with the clothing item. For example, the XR device may retrieve the metadata from a server (as previously shown). The XR device may identify a three-dimensional model of the user. For example, the XR device may retrieve the three-dimensional model of the user from the server.

As shown by reference number 406, the XR device may generate a three-dimensional model of the user wearing the clothing item, which may be based on the three-dimensional model of the user and the metadata. The XR device may apply the clothing item to the three-dimensional model of the user, based on the metadata, to generate the three-dimensional model of the user wearing the clothing item.

As shown by reference number 408, the XR device may provide, via an interface of the XR device, three-dimensional model of the user wearing the clothing item. For example, the XR device may display the three-dimensional model of the user wearing the clothing item, which may be presented as an overlay to a real world scene. As a result, while the user is looking at the electronic page associated with the online retail store, the XR device may display the three-dimensional model of the user wearing the clothing item.

In some implementations, the user may be unable to visit a physical retail store, and the user may instead shop at the online retail store. The user may look at a clothing item to purchase at the online retail store. By generating the three-dimensional model of themselves wearing the clothing item, the user may be able to assess whether the clothing item is suitable, even though the user is not able to physically see and feel the clothing item. In some cases, the user may select different clothing items, which may allow multiple three-dimensional models of the user wearing the different clothing items to be generated. Online shopping may be more convenient than visiting physical retail stores in person, and the user may be able to utilize the XR device for online shopping as well. In some implementations, when online shopping, the three-dimensional model of the user wearing the clothing item may still be shared with other users via a social media platform, and the user may receive feedback from the other users regarding whether the user should purchase the clothing item.

As indicated above, FIG. 4 is provided as an example. Other examples may differ from what is described with regard to FIG. 4.

Figure 5A:
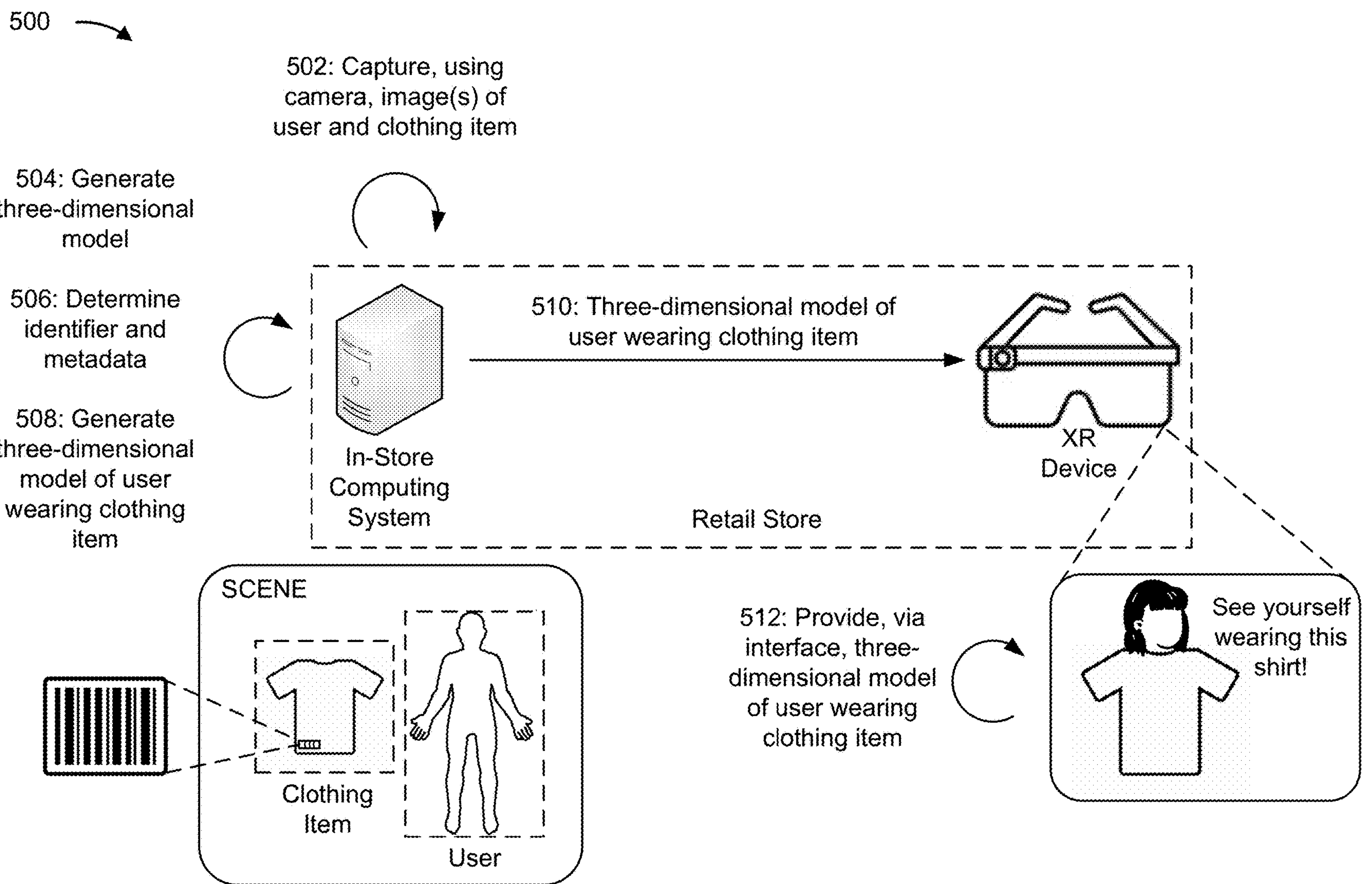
FIGS. 5A-5B are diagrams of an example related to generating three-dimensional models of users wearing clothing items.
Figure 5B:
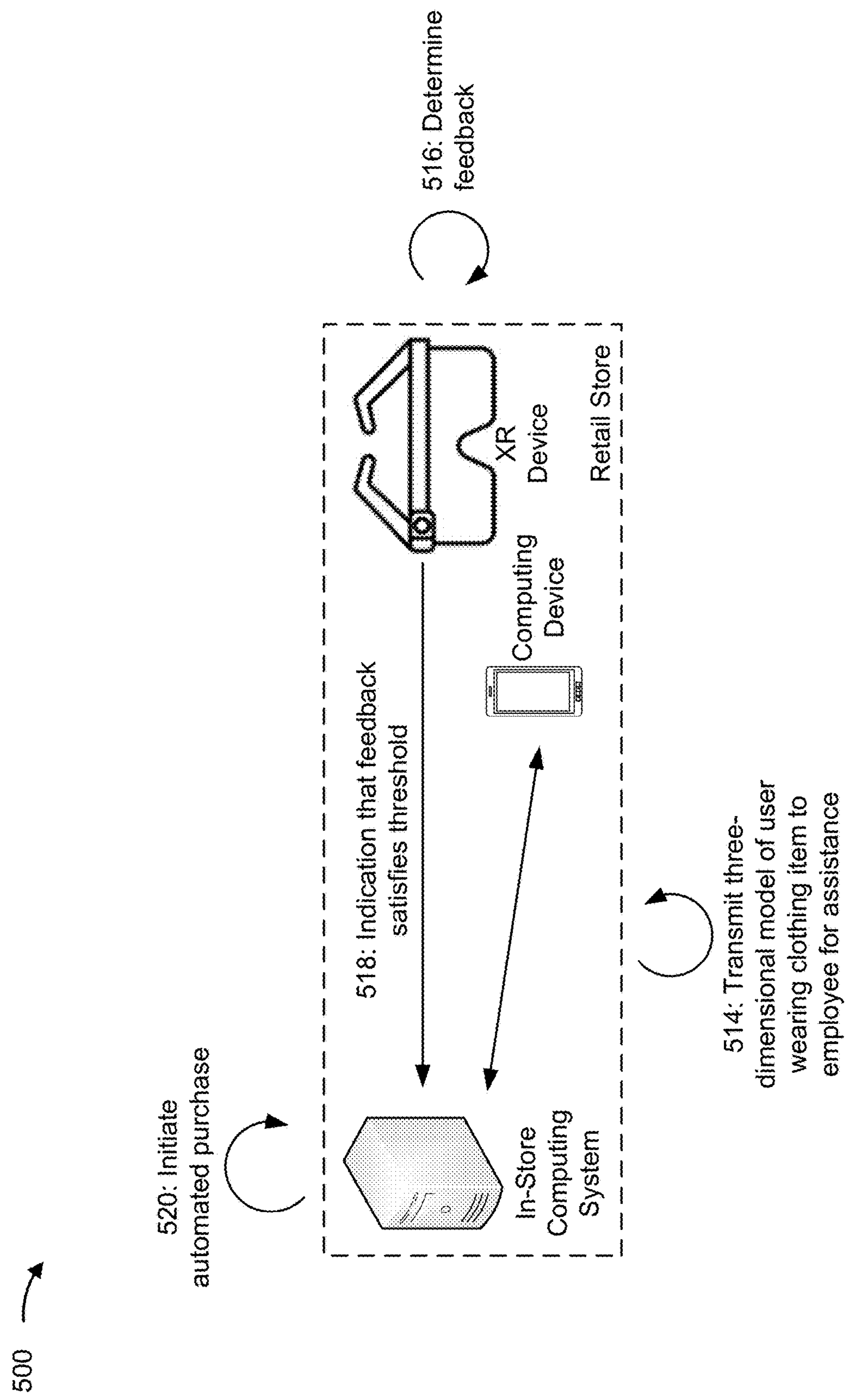

FIGS. 5A-5B are diagrams of an example 500 related to generating three-dimensional models of users wearing clothing items. As shown in FIGS. 5A-5B, example 500 includes an XR device, an in-store computing system, and computing devices. These devices are described in more detail in connection with FIGS. 6 and 7.

As shown in FIG. 5A, and by reference number 502, the in-store computing system may capture, using a camera, one or more images of a user of an XR device and a clothing item. The user and the clothing item may be within a field of view of the camera of the in-store computing system. For example, at a physical retail store, the user may stand in front of the in-store computing system. The user may be holding the clothing item, where the user may be considering whether to purchase the clothing item. The in-store computing system may capture the one or more images of the user and the clothing item. In some cases, the in-store computing system may capture the one or more images of the user when the user is not wearing (or carrying) the XR device, such that a face of the user is visible.

As shown by reference number 504, the in-store computing system may generate a three-dimensional model of the user based on the one or more images of the user. For example, the in-store computing system may create the three-dimensional model of the user using a series of two-dimensional images of the user. The in-store computing system may extract three-dimensional information, from the one or more two-dimensional images of the user, in order to form the three-dimensional model. The three-dimensional model of the user may be a body wire frame associated with the user. The in-store computing system may store the three-dimensional model of the user for future use.

As shown by reference number 506, the in-store computing system may determine an identifier associated with the clothing item. The in-store computing system may scan, using the camera, a tag that indicates a code associated with the clothing item. The in-store computing system may read the code based on the one or more images captured by the camera. The in-store computing system may determine the identifier associated with the clothing item based on the code. The in-store computing system may determine, based on the identifier, metadata associated with the clothing item.

As shown by reference number 508, the in-store computing system may generate a three-dimensional model of the user wearing the clothing item, which may be based on the three-dimensional model of the user and the metadata. The in-store computing system may apply the clothing item to the three-dimensional model of the user, based on the metadata, to generate the three-dimensional model of the user wearing the clothing item.

As shown by reference number 510, the in-store computing system may transmit the three-dimensional model of the user wearing the clothing item to the XR device. The in-store computing system may be in proximity (e.g., within 100 feet) to the XR device, since the user associated with the XR device may still be within the physical retail store. The XR device may receive the three-dimensional model of the user wearing the clothing item from the in-store computing system.

As shown by reference number 512, the XR device may provide, via an interface, the three-dimensional model of the user wearing the clothing item. For example, the XR device may display the three-dimensional model of the user wearing the clothing item, which may be presented as an overlay to a real world scene. The XR device may provide, via the interface, augmented controls along with the three-dimensional model of the user wearing the clothing item. The augmented controls may be for performing a variety of actions (e.g., modifying features) with respect to the three-dimensional model of the user wearing the clothing item.

In some implementations, the physical retail store may provide, as an offering to a user that visits the physical retail store, an ability to create a three-dimensional model of the user. After the three-dimensional model of the user is created, clothing items that are of potential interest to the user may be applied to the three-dimensional model of the user to generate the three-dimensional model of the user wearing the clothing item. The user may view the three-dimensional model of the user wearing the clothing item on their own XR device, or the user may obtain an XR device from the physical retail store to view the three-dimensional model of the user wearing the clothing item. The physical retail store may store the three-dimensional model of the user, which may be used the next time the user visits the physical retail store and/or for online purchases of clothing items offered by the physical retail store.

As shown in FIG. 5B, and by reference number 514, the in-store computing system may transmit the three-dimensional model of the user with the clothing item to a computing device associated with an employee of the physical retail store. The employee may be able to help the user based on the three-dimensional model of the user with the clothing item. The in-store computing system may transmit the three-dimensional model of the user with the clothing item to third parties, such as a hair stylist, an optician, a personal assistant, or other types of people. As shown by reference number 516, the XR device may collect feedback from a plurality of users via a social media platform, where the feedback may be associated with the three-dimensional model of the user wearing the clothing item. The XR device may determine that the feedback (e.g., a rating) satisfies a threshold. As shown by reference number 518, the XR device may transmit, to the in-store computing system, an indication that the feedback satisfies the threshold. The in-store computing system may receive the indication from the XR device. As shown by reference number 520, the in-store computing system may initiate an automated purchase of the clothing item based on the indication received from the XR device. For example, the in-store computing system may initiate the automated purchase since the feedback satisfies the threshold.

In some implementations, the XR device may receive, from the in-store computing device, a recommendation associated with additional three-dimensional models of other users with related clothing items. The in-store computing device may generate the additional three-dimensional models based on information associated with other users that have visited the physical retail store. The additional three-dimensional models may not have the actual faces of the other users for privacy reasons. The additional three-dimensional models may have some similar traits to traits of the user, such as face shape, hair color, ethnicity, and so on. The XR device may provide, via the interface, the recommendation associated with the additional three-dimensional models of other users with related clothing items. As a result, the user of the XR device may be provided with recommendations for other types of clothing items. The recommendations may be based on shopping preferences of the user and/or a size of the user. The shopping preferences may indicate whether the user likes certain clothing items (e.g., polos), materials (e.g., cotton), and so on.

In some implementations, the XR device may provide, via the interface, an augmented control to purchase the clothing item. The XR device may receive, via the interface, a command for purchasing the clothing item. The XR device may transmit, to the in-store computing device, the command for purchasing the clothing item. The in-store computing device may receive, from the XR device, the command for purchasing the clothing item. The in-store computing device may initiate a purchase of the clothing item based on the command received from the XR device.

As indicated above, FIG. 5 is provided as an example. Other examples may differ from what is described with regard to FIG. 5.

Figure 6:
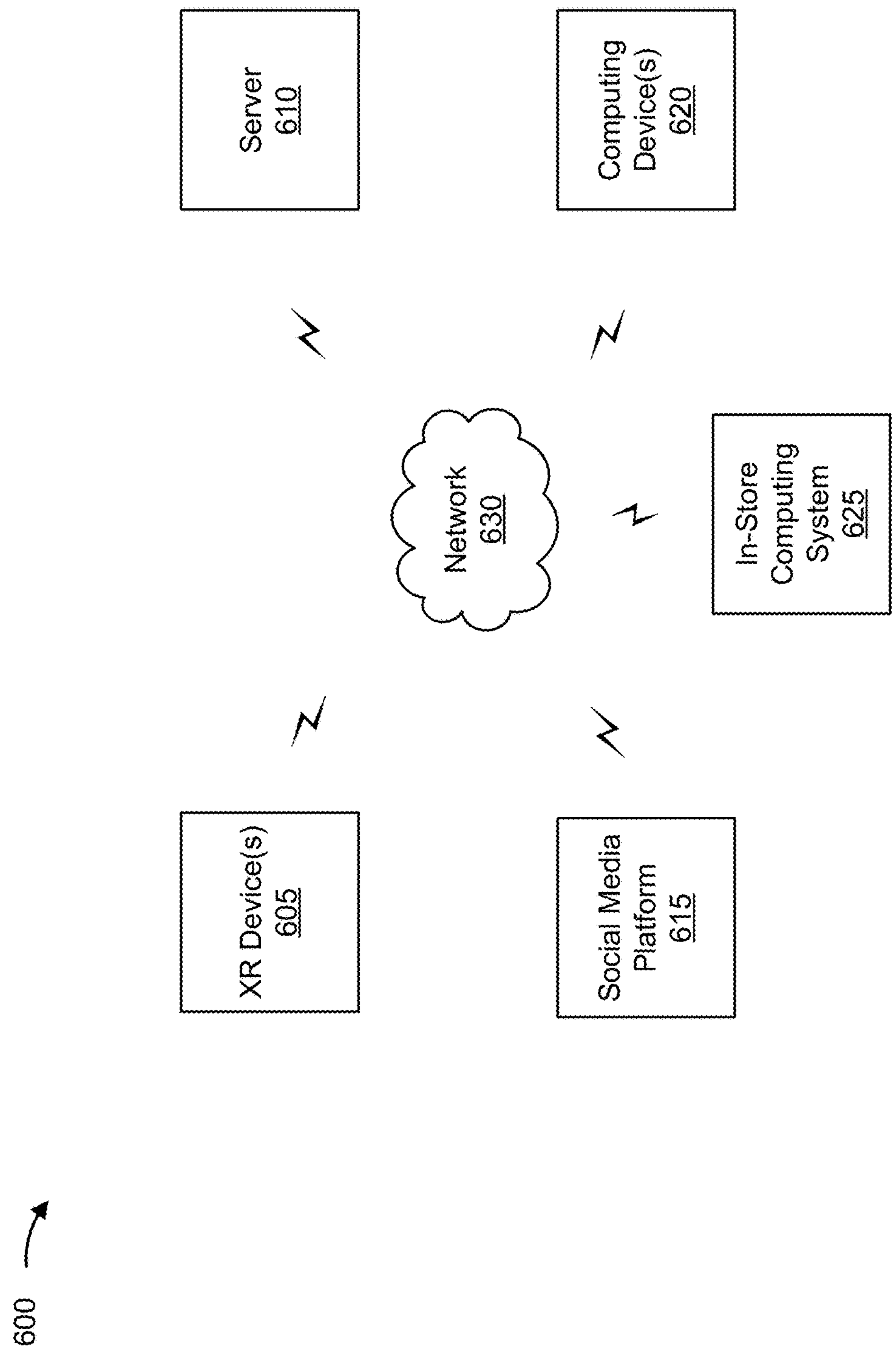
FIG. 6 is a diagram illustrating an example environment in which systems and/or methods described herein may be implemented.

FIG. 6 is a diagram of an example environment 600 in which systems and/or methods described herein may be implemented. As shown in FIG. 6, environment 600 may include XR devices 605, a server 610, a social media platform 615, computing devices 620, an in-store computing system 625, and a network 630. Devices of environment 600 may interconnect via wired connections, wireless connections, or a combination of wired and wireless connections.

An XR device 605 may be capable of receiving, generating, storing, processing, providing, and/or routing information associated with generating three-dimensional models of users wearing clothing items, as described elsewhere herein. The XR device 605 may be a head-mounted device (or headset) or a mobile device. The XR device 605 may provide XR capabilities, which may include AR, MR, and/or VR. The XR device 605 may include various types of hardware, such as processors, sensors, cameras, input devices, and/or displays. The sensors may include accelerometers, gyroscopes, magnetometers, and/or eye-tracking sensors. The XR device 605 may include an optical head-mounted display, which may allow information to be superimposed onto a field of view.

The server 610 includes one or more devices capable of receiving, generating, storing, processing, providing, and/or routing information associated with providing and/or generating three-dimensional models of users wearing clothing items, as described elsewhere herein. The server 610 may include a communication device and/or a computing device. For example, the server 610 may be an application server, a client server, a web server, a database server, a host server, a proxy server, a virtual server (e.g., executing on computing hardware), or a server in a cloud computing system. In some implementations, the server 610 includes computing hardware used in a cloud computing environment.

The social media platform 615 includes one or more devices capable of receiving, generating, storing, processing, providing, and/or routing information associated with facilitating an exchange of information via social networks, as described elsewhere herein. The social media platform 615 may include communication devices and/or computing devices. For example, the social media platform 615 may include application servers, client servers, web servers, database servers, host servers, proxy servers, virtual servers (e.g., executing on computing hardware), or servers in a cloud computing system. In some implementations, the social media platform 615 includes computing hardware used in a cloud computing environment.

The computing devices 620 include one or more devices capable of receiving, generating, storing, processing, providing, and/or routing information associated with providing and/or generating three-dimensional models of users wearing clothing items, as described elsewhere herein. The computing devices 620 may include communication devices and/or computing devices. For example, the computing devices 620 may include wireless communication devices, phones such as smart phones, mobile phones or video phones, user equipment, laptop computers, tablet computers, desktop computers, or similar types of devices.

The in-store computing system 625 includes one or more devices capable of receiving, generating, storing, processing, providing, and/or routing information associated with providing and/or generating three-dimensional models of users wearing clothing items, as described elsewhere herein. The in-store computing system 625 may include a communication device and/or a computing device. For example, the in-store computing system 625 may include a wireless communication device, such as a smart, a mobile phone, a user equipment, a laptop computer, a tablet computer, a desktop computer, or a similar type of device. The in-store computing system 625 may be included in a physical retail store. The in-store computing system 625 may include a camera for capturing images of users and/or clothing items in the physical retail store.

The network 630 includes one or more wired and/or wireless networks. For example, the network 630 may include a cellular network, a public land mobile network, a local area network, a wide area network, a metropolitan area network, a telephone network, a private network, the Internet, and/or a combination of these or other types of networks. The network 630 enables communication among the devices of environment 600.

The number and arrangement of devices and networks shown in FIG. 6 are provided as an example. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of environment 600 may perform one or more functions described as being performed by another set of devices of environment 600.

Figure 7:
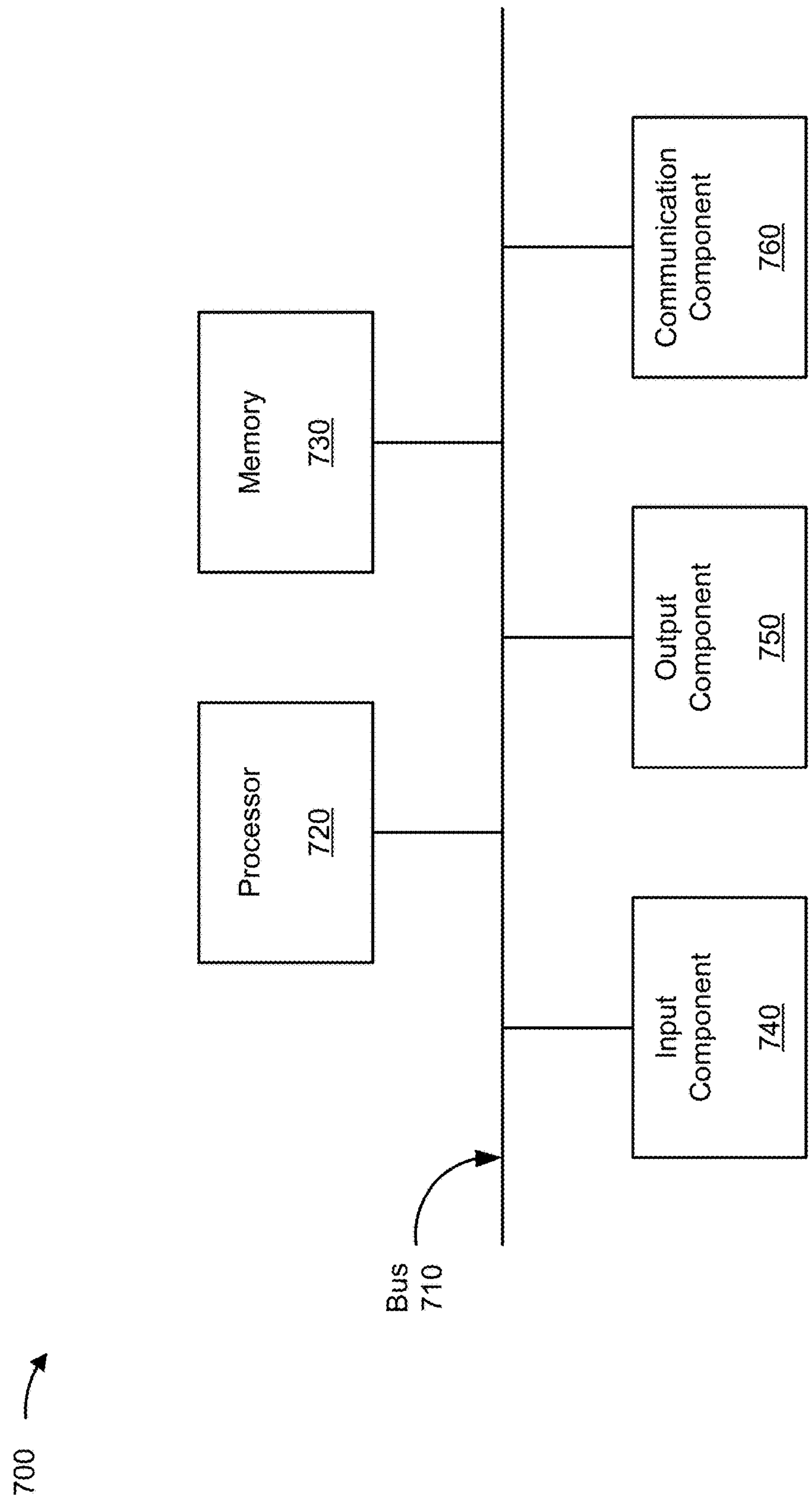
FIG. 7 is a diagram of example components of one or more devices of FIG. 6.

FIG. 7 is a diagram of example components of a device 700 associated with generating three-dimensional models of users wearing clothing items. Device 700 may correspond to XR devices 605, server 610, social media platform 615, computing devices 620, and/or in-store computing system 625. In some implementations, XR devices 605, server 610, social media platform 615, computing devices 620, and/or in-store computing system 625 may include one or more devices 700 and/or one or more components of device 700. As shown in FIG. 7, device 700 may include a bus 710, a processor 720, a memory 730, an input component 740, an output component 750, and a communication component 760.

Bus 710 may include one or more components that enable wired and/or wireless communication among the components of device 700. Bus 710 may couple together two or more components of FIG. 7, such as via operative coupling, communicative coupling, electronic coupling, and/or electric coupling. Processor 720 may include a central processing unit, a graphics processing unit, a microprocessor, a controller, a microcontroller, a digital signal processor, a field-programmable gate array, an application-specific integrated circuit, and/or another type of processing component. Processor 720 is implemented in hardware, firmware, or a combination of hardware and software. In some implementations, processor 720 may include one or more processors capable of being programmed to perform one or more operations or processes described elsewhere herein.

Memory 730 may include volatile and/or nonvolatile memory. For example, memory 730 may include random access memory (RAM), read only memory (ROM), a hard disk drive, and/or another type of memory (e.g., a flash memory, a magnetic memory, and/or an optical memory). Memory 730 may include internal memory (e.g., RAM, ROM, or a hard disk drive) and/or removable memory (e.g., removable via a universal serial bus connection). Memory 730 may be a non-transitory computer-readable medium. Memory 730 stores information, instructions, and/or software (e.g., one or more software applications) related to the operation of device 700. In some implementations, memory 730 may include one or more memories that are coupled to one or more processors (e.g., processor 720), such as via bus 710.

Input component 740 enables device 700 to receive input, such as user input and/or sensed input. For example, input component 740 may include a touch screen, a keyboard, a keypad, a mouse, a button, a microphone, a switch, a sensor, a global positioning system sensor, an accelerometer, a gyroscope, and/or an actuator. Output component 750 enables device 700 to provide output, such as via a display, a speaker, and/or a light-emitting diode. Communication component 760 enables device 700 to communicate with other devices via a wired connection and/or a wireless connection. For example, communication component 760 may include a receiver, a transmitter, a transceiver, a modem, a network interface card, and/or an antenna.

Device 700 may perform one or more operations or processes described herein. For example, a non-transitory computer-readable medium (e.g., memory 730) may store a set of instructions (e.g., one or more instructions or code) for execution by processor 720. Processor 720 may execute the set of instructions to perform one or more operations or processes described herein. In some implementations, execution of the set of instructions, by one or more processors 720, causes the one or more processors 720 and/or the device 700 to perform one or more operations or processes described herein. In some implementations, hardwired circuitry is used instead of or in combination with the instructions to perform one or more operations or processes described herein. Additionally, or alternatively, processor 720 may be configured to perform one or more operations or processes described herein. Thus, implementations described herein are not limited to any specific combination of hardware circuitry and software.

The number and arrangement of components shown in FIG. 7 are provided as an example. Device 700 may include additional components, fewer components, different components, or differently arranged components than those shown in FIG. 7. Additionally, or alternatively, a set of components (e.g., one or more components) of device 700 may perform one or more functions described as being performed by another set of components of device 700.

Figure 8:
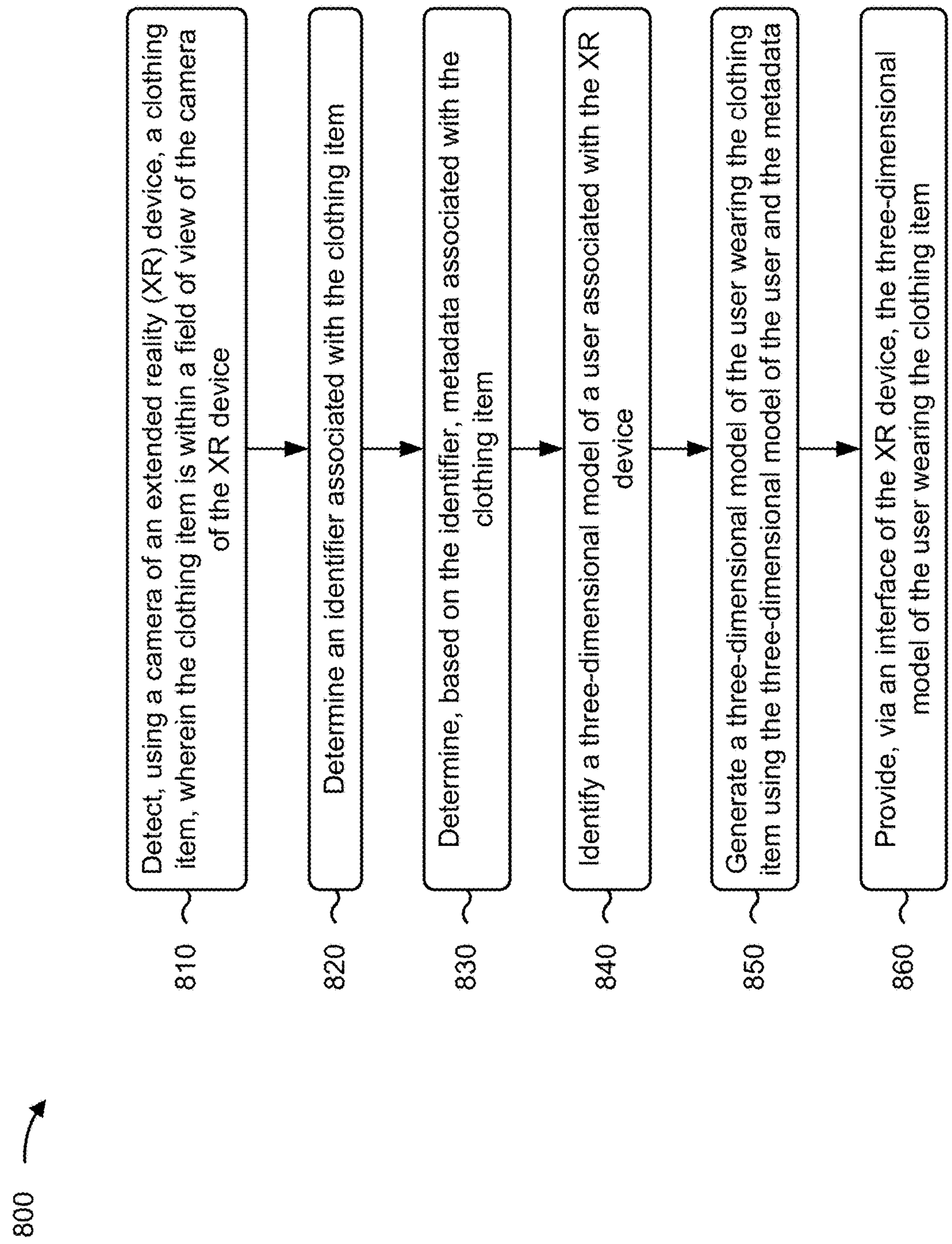
FIGS. 8-9 are flowcharts of example processes relating to generating three-dimensional models of users wearing clothing items.

FIG. 8 is a flowchart of an example method 800 associated with generating three-dimensional models of users wearing clothing items. In some implementations, an XR device (e.g., XR device 605) may perform or may be configured to perform one or more process blocks of FIG. 8. In some implementations, another device or a group of devices separate from or including the XR device (e.g., server 610 and/or in-store computing system 625) may perform or may be configured to perform one or more process blocks of FIG. 8. Additionally, or alternatively, one or more components of the XR device (e.g., processor 720, memory 730, input component 740, output component 750, and/or communication component 760) may perform or may be configured to perform one or more process blocks of FIG. 8.

As shown in FIG. 8, the method 800 may include detecting, using a camera of the XR device, a clothing item, wherein the clothing item is within a field of view of the camera of the XR device (block 810). As further shown in FIG. 8, the method 800 may include determining an identifier associated with the clothing item (block 820). As further shown in FIG. 8, the method 800 may include determining, based on the identifier, metadata associated with the clothing item (block 830). As further shown in FIG. 8, the method 800 may include identifying a three-dimensional model of the user (block 840). As further shown in FIG. 8, the method 800 may include generating a three-dimensional model of the user wearing the clothing item using the three-dimensional model of the user and the metadata (block 850). As further shown in FIG. 8, the method 800 may include providing, via an interface of the XR device, the three-dimensional model of the user wearing the clothing item (block 860).

Although FIG. 8 shows example blocks of a method 800, in some implementations, the method 800 may include additional blocks, fewer blocks, different blocks, or differently arranged blocks than those depicted in FIG. 8. Additionally, or alternatively, two or more of the blocks of the method 800 may be performed in parallel. The method 800 is an example of one method that may be performed by one or more devices described herein. These one or more devices may perform or may be configured to perform one or more other methods based on operations described herein, such as the operations described in connection with FIGS. 1A-1D, 2-4, and 5A-5B.

Figure 9:
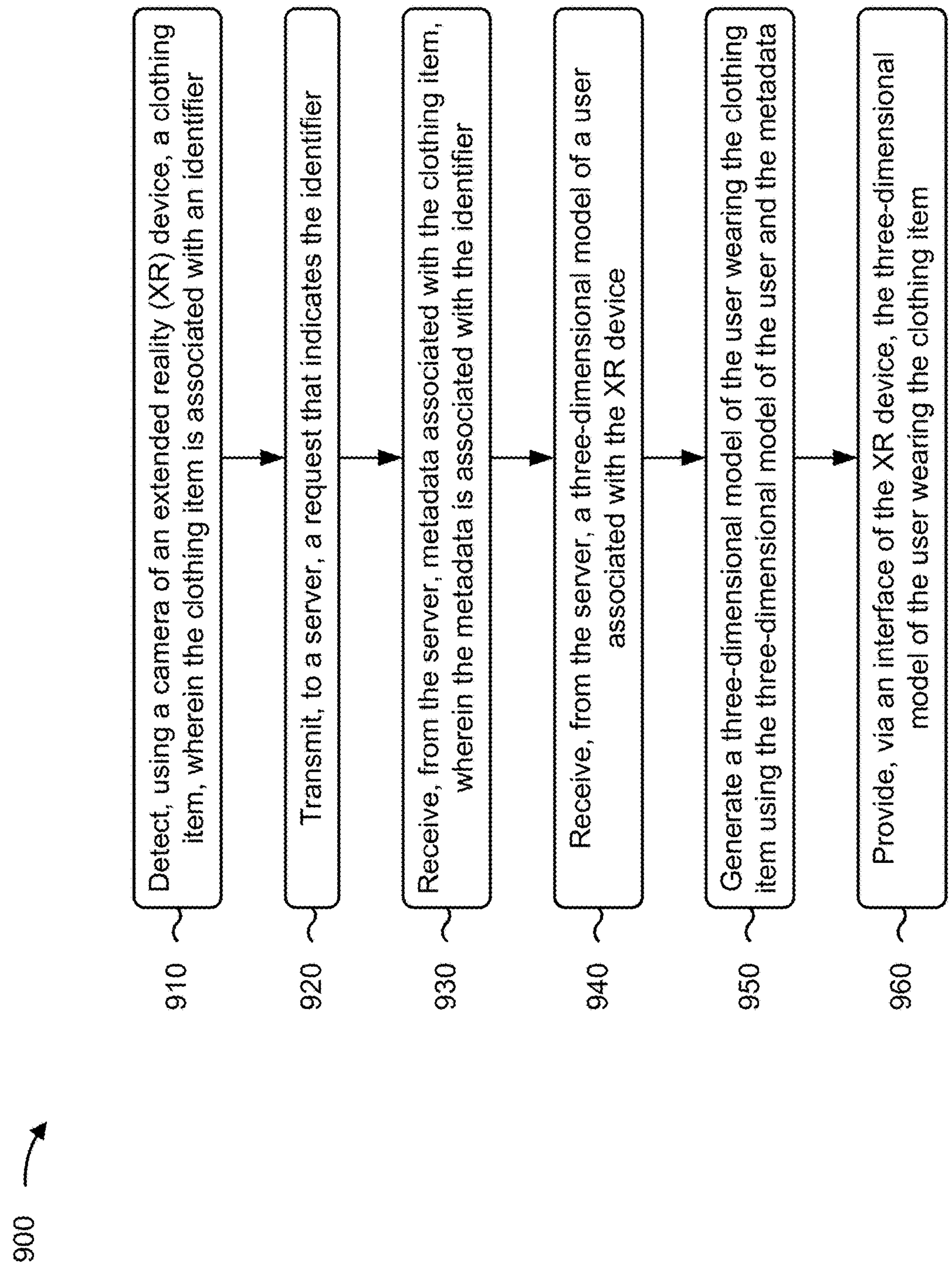

FIG. 9 is a flowchart of an example method 900 associated with generating three-dimensional models of users wearing clothing items. In some implementations, an XR device (e.g., XR device 605) may perform or may be configured to perform one or more process blocks of FIG. 9. In some implementations, another device or a group of devices separate from or including the XR device (e.g., server 610 and/or in-store computing system 625) may perform or may be configured to perform one or more process blocks of FIG. 9. Additionally, or alternatively, one or more components of the XR device (e.g., processor 720, memory 730, input component 740, output component 750, and/or communication component 760) may perform or may be configured to perform one or more process blocks of FIG. 9.

As shown in FIG. 9, the method 900 may include detecting, using a camera of an XR device, a clothing item, wherein the clothing item is associated with an identifier (block 910). As further shown in FIG. 9, the method 900 may include transmitting, to a server, a request that indicates the identifier (block 920). As further shown in FIG. 9, the method 900 may include receiving, from the server, metadata associated with the clothing item, wherein the metadata is associated with the identifier (block 930). As further shown in FIG. 9, the method 900 may include retrieving, from the server, a three-dimensional model of a user associated with the XR device (block 940). As further shown in FIG. 9, the method 900 may include generating a three-dimensional model of the user wearing the clothing item using the three-dimensional model of the user and the metadata (block 950). As further shown in FIG. 9, the method 900 may include providing, via an interface of the XR device, the three-dimensional model of the user wearing the clothing item (block 960).

Although FIG. 9 shows example blocks of a method 900, in some implementations, the method 900 may include additional blocks, fewer blocks, different blocks, or differently arranged blocks than those depicted in FIG. 9. Additionally, or alternatively, two or more of the blocks of the method 900 may be performed in parallel. The method 900 is an example of one method that may be performed by one or more devices described herein. These one or more devices may perform or may be configured to perform one or more other methods based on operations described herein, such as the operations described in connection with FIGS. 1A-1D, 2-4, and 5A-5B.

In some implementations, an extended reality (XR) device includes one or more components configured to: detect, using a camera of the XR device, a clothing item, wherein the clothing item is within a field of view of the camera of the XR device; determine an identifier associated with the clothing item; determine, based on the identifier, metadata associated with the clothing item; identify a three-dimensional model of the user; generate a three-dimensional model of the user wearing the clothing item using the three-dimensional model of the user and the metadata; and provide, via an interface of the XR device, the three-dimensional model of the user wearing the clothing item.

In some implementations, a method includes detecting, using a camera of an extended reality (XR) device, a clothing item, wherein the clothing item is associated with an identifier; transmitting, to a server, a request that indicates the identifier; receiving, from the server, metadata associated with the clothing item, wherein the metadata is associated with the identifier; retrieving, from the server, a three-dimensional model of a user associated with the XR device; generating a three-dimensional model of the user wearing the clothing item using the three-dimensional model of the user and the metadata; and providing, via an interface of the XR device, the three-dimensional model of the user wearing the clothing item.

In some implementations, a system includes an extended reality (XR) device; and in-store computing device, comprising: a camera configured to: capture one or more images of a user in a physical retail store and a clothing item, wherein the user and the clothing item are within a field of view of the camera; one or more components configured to: receive the one or more images from the camera; generate, based on the one or more images, a three-dimensional model of the user; determine, based on the one or more images, an identifier associated with the clothing item; determine, based on the identifier, metadata associated with the clothing item; generate a three-dimensional model of the user wearing the clothing item based on the metadata associated with the clothing item; and transmit, to the XR device associated with the user, the three-dimensional model of the user wearing the clothing item to permit the XR device to receive the three-dimensional model of the user wearing the clothing item and provide, via an interface of the XR device, the three-dimensional model of the user wearing the clothing item.

The foregoing disclosure provides illustration and description but is not intended to be exhaustive or to limit the implementations to the precise forms disclosed. Modifications and variations may be made in light of the above disclosure or may be acquired from practice of the implementations described herein.

The orientations of the various elements in the figures are shown as examples, and the illustrated examples may be rotated relative to the depicted orientations. The descriptions provided herein, and the claims that follow, pertain to any structures that have the described relationships between various features, regardless of whether the structures are in the particular orientation of the drawings, or are rotated relative to such orientation. Similarly, spatially relative terms, such as "below," "beneath," "lower," "above," "upper," "middle," "left," and "right," are used herein for ease of description to describe one element's relationship to one or more other elements as illustrated in the figures. The spatially relative terms are intended to encompass different orientations of the element, structure, and/or assembly in use or operation in addition to the orientations depicted in the figures. A structure and/or assembly may be otherwise oriented (rotated 90 degrees or at other orientations), and the spatially relative descriptors used herein may be interpreted accordingly. Furthermore, the cross-sectional views in the figures only show features within the planes of the cross-sections, and do not show materials behind the planes of the cross-sections, unless indicated otherwise, in order to simplify the drawings.

As used herein, the terms "substantially" and "approximately" mean "within reasonable tolerances of manufacturing and measurement." As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. An extended reality (XR) device, comprising:

one or more components configured to:

detect, using a camera of the XR device, a clothing item, wherein the clothing item is within a field of view of the camera of the XR device;

determine an identifier associated with the clothing item;

determine, based on the identifier, metadata associated with the clothing item;

identify a three-dimensional model of a user associated with the XR device;

generate a three-dimensional model of the user wearing the clothing item using the three-dimensional model of the user and the metadata associated with the clothing item;

provide, via a display interface of the XR device, the three-dimensional model of the user wearing the clothing item;

provide, via the display interface, augmented controls for modifying features of the three-dimensional model of the user wearing the clothing item, wherein the augmented controls include at least a virtual slider for modifying the features of the three-dimensional model of the user wearing the clothing item;

receive, via an input component of the XR device, a gesture-based command associated with the augmented controls for modifying the features of the three-dimensional model of the user wearing the clothing item;

provide, via the display interface, the three-dimensional model of the user wearing the clothing item and with the modified features;

receive, via a transceiver of the XR device, feedback related to the three-dimensional model of the user wearing the clothing item and with the modified features; and provide, via the display interface, a notification based on the feedback, wherein the notification includes an indication of the feedback and a suggestion to purchase the clothing item based on a content of the feedback.

2. The XR device of claim 1, wherein the one or more components are configured to:

detect, using the camera of the XR device, the clothing item in a physical retail store.

3. The XR device of claim 1, wherein the one or more components are configured to:

scan, using the camera of the XR device, a code associated with the clothing item; and determine the identifier associated with the clothing item based on the code.

4. The XR device of claim 1, wherein the one or more components are configured to:

transmit, to a server, a request for the metadata associated with the clothing item and the three-dimensional model of the user; and receive, from the server and based on the request, the metadata associated with the clothing item and the three-dimensional model of the user.

5. The XR device of claim 1, wherein the metadata associated with the clothing item includes one or more of: stretch information associated with the clothing item, torsion information associated with the clothing item, or physical behaviors associated with the clothing item.

6. The XR device of claim 1, wherein the features include one or more of: facial properties, a hairstyle, a makeup style, accessories, or a weight of the user.

7. The XR device of claim 1, wherein the one or more components are configured to:

provide, via the display interface, second augmented controls for adjusting a viewing angle associated with the three-dimensional model of the user wearing the clothing item; or provide, via the display interface, second augmented controls for adjusting a pose or a movement of the three-dimensional model of the user wearing the clothing item.

8. The XR device of claim 1, wherein the one or more components are configured to:

generate multiple three-dimensional models of the user wearing the clothing item, wherein each of the multiple three-dimensional models of the user wearing the clothing item is associated with a different size of the clothing item; and provide, via the display interface, the multiple three-dimensional models of the user wearing the clothing item.

9. The XR device of claim 1, wherein the one or more components are configured to:

generate multiple three-dimensional models of the user with different clothing items; and provide, via the display interface, the multiple three-dimensional models of the user wearing the different clothing items.

10. The XR device of claim 1, wherein the one or more components are configured to:

upload the three-dimensional model of the user wearing the clothing item to a social media platform, wherein the feedback is received via the social media platform.

11. The XR device of claim 1, wherein the one or more components are configured to:

provide, via the display interface, a three-dimensional scene on which the three-dimensional model of the user wearing the clothing item is overlayed.

12. The XR device of claim 1, wherein the XR device is a first XR device, the user is a first user, and the three-dimensional model is a first three-dimensional model, and wherein the one or more components are configured to:

receive, from a second XR device, a second three-dimensional model of a second user wearing the clothing item; and provide, via the display interface, a three-dimensional scene on which the first three-dimensional model and the second three-dimensional model are overlayed.

13. The XR device of claim 1, wherein the one or more components are configured to:

detect, using the camera of the XR device, the clothing item based on an image of the clothing item that is displayed on a computing device, wherein the computing device is within the field of view of the camera of the XR device.

14. The XR device of claim 1, wherein the one or more components are configured to:

share, via the transceiver of the XR device, the three-dimensional model of the user wearing the clothing item with a selected group of computing devices; and set a timer based on a user preference, wherein the feedback is received from one or more devices of the selected group of computing devices prior to an expiry of the timer, and wherein the notification is provided after the expiry of the timer.

15. A method, comprising:

detecting, using a camera of an extended reality (XR) device, a clothing item, wherein the clothing item is associated with an identifier;

transmitting, to a server via a transceiver of the XR device, a request that indicates the identifier;

receiving, from the server via the transceiver of the XR device, metadata associated with the clothing item, wherein the metadata is associated with the identifier;

receiving, from the server via the transceiver of the XR device, a three-dimensional model of a user associated with the XR device;

generating a three-dimensional model of the user wearing the clothing item using the three-dimensional model of the user and the metadata;

providing, via a display interface of the XR device, the three-dimensional model of the user wearing the clothing item;

providing, via the display interface, augmented controls for modifying features of the three-dimensional model of the user wearing the clothing item, wherein the augmented controls include at least a virtual slider for modifying the features of the three-dimensional model of the user wearing the clothing item;

receiving, via an input component of the XR device, a gesture-based command associated with the augmented controls for modifying the features of the three-dimensional model of the user wearing the clothing item;

providing, via the display interface, the three-dimensional model of the user wearing the clothing item and with the modified features;

receiving, via the transceiver of the XR device, feedback related to the three-dimensional model of the user wearing the clothing item and with the modified features; and providing, via the display interface, a notification based on the feedback, wherein the notification includes an indication of the feedback and a suggestion to purchase the clothing item based on a content of the feedback.

16. The method of claim 15, wherein the clothing item is physically located in a physical retail store, and wherein the clothing item is within a field of view of the camera of the XR device.

17. The method of claim 15, wherein the clothing item is displayed via an electronic page, and wherein a computing device that displays the electronic page with the clothing item is within a field of view of the camera of the XR device.

18. The method of claim 15, further comprising:

sharing, via the transceiver of the XR device, the three-dimensional model of the user wearing the clothing item with a selected group of computing devices; and setting a timer based on a user preference, wherein the feedback is received from the selected group of computing devices prior to an expiry of the timer, and wherein the notification is provided after the expiry of the timer.

19. The method of claim 15, further comprising:

uploading the three-dimensional model of the user wearing the clothing item to a social media platform, wherein the feedback is received via the social media platform.

20. The method of claim 15, wherein the features include one or more of: facial properties, a hairstyle, a makeup style, accessories, or a weight of the user.

21. A system, comprising:

an in-store computing device, comprising:

a camera in a physical retail store configured to:

capture one or more images of a user and a clothing item, wherein the user and the clothing item are within a field of view of the camera;

one or more components configured to:

receive the one or more images from the camera;

generate, based on the one or more images, a three-dimensional model of the user;

determine, based on the one or more images, an identifier associated with the clothing item;

determine, based on the identifier, metadata associated with the clothing item;

generate a three-dimensional model of the user wearing the clothing item based on the metadata associated with the clothing item; and transmit, to an extended reality (XR) device associated with the user, the three-dimensional model of the user wearing the clothing item; and the XR device, comprising:

one or more components configured to:

receive, via a transceiver of the XR device, the three-dimensional model of the user wearing the clothing item;

provide, via a display interface of the XR device, the three-dimensional model of the user wearing the clothing item;

provide, via the display interface, augmented controls for modifying features of the three-dimensional model of the user wearing the clothing item, wherein the augmented controls include at least a virtual slider for modifying the features of the three-dimensional model of the user wearing the clothing item;

receive, via an input component of the XR device, a gesture-based command associated with the augmented controls for modifying the features of the three-dimensional model of the user wearing the clothing item;

provide, via the display interface, the three-dimensional model of the user wearing the clothing item and with the modified features;

receive, via the transceiver of the XR device, feedback related to the three-dimensional model of the user wearing the clothing item and with the modified features; and provide, via the display interface, a notification based on the feedback, wherein the notification includes an indication of the feedback and a suggestion to purchase the clothing item based on a content of the feedback.

22. The system of claim 21, wherein the one or more components of the in-store computing device are configured to:

transmit the three-dimensional model of the user wearing the clothing item to a computing device associated with an employee of the physical retail store.

23. The system of claim 21, wherein the one or more components of the XR device are configured to:

receive, from the in-store computing device via the transceiver, a recommendation associated with related clothing items; and provide, via the display interface, the recommendation associated with the related clothing items.

24. The system of claim 21, wherein:

the one or more components of the XR device are configured to:

provide, via the display interface with the notification, a second augmented control to purchase the clothing item;

receive, via the input component of the XR device, a command for purchasing the clothing item; and transmit, to the in-store computing device via the transceiver, the command for purchasing the clothing item; and the one or more components of the in-store computing device are configured to:

receive, from the XR device, the command for purchasing the clothing item; and initiate a purchase of the clothing item based on the command received from the XR device.

25. The system of claim 21, wherein the features include one or more of: facial properties, a hairstyle, a makeup style, accessories, or a weight of the user.

* * * * *